US012775658B1

(12) United States Patent
Mogill

(10) Patent No.: US 12,775,658 B1
(45) Date of Patent: Oct. 27, 2026

(54) APPARATUS FOR AND METHOD OF AUTOMATED GENERATION OF AN OPTIMIZED MEDIA INPUT

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/414,190

(22) Filed: Dec. 9, 2025

(51) Int. Cl.
*G06F 16/432* (2019.01)
*G06F 16/23* (2019.01)
*G06F 16/41* (2019.01)

(52) U.S. Cl.
CPC ........ *G06F 16/433* (2019.01); *G06F 16/2365* (2019.01); *G06F 16/41* (2019.01)

(58) Field of Classification Search
CPC ..... G06F 16/433; G06F 16/2365; G06F 16/41
USPC .................................. 707/741, 756; 704/275
See application file for complete search history.

(56) References Cited

U.S. PATENT DOCUMENTS

| | | | | |
|---|---|---|---|---|
| 7,613,613 | B2 | 11/2009 | Fields et al. | |
| 10,510,355 | B2 * | 12/2019 | Kjoerling | G10L 19/167 |
| 11,100,941 | B2 | 8/2021 | Sargsyan et al. | |
| 2003/0046316 | A1 * | 3/2003 | Gergic | G06F 9/451 715/255 |
| 2004/0034532 | A1 * | 2/2004 | Mukhopadhyay | G10L 13/00 704/270.1 |
| 2018/0012598 | A1 * | 1/2018 | Thirukovalluru | G10L 15/26 |
| 2021/0195281 | A1 * | 6/2021 | Zhao | H04N 21/43072 |
| 2023/0342145 | A1 * | 10/2023 | Kandel | G06F 8/77 |

FOREIGN PATENT DOCUMENTS

| | | | |
|---|---|---|---|
| WO | 2019222591 | A1 | 11/2019 |
| WO | 2022048354 | A1 | 3/2022 |

OTHER PUBLICATIONS

Eva Szekely et al.Voice Reconstruction through Large-Scale TTS Models: Comparing Zero-Shot and Fine-tuning Approaches to Personalise TTS in Assistive Communication; Voice Reconstruction through Large-Scale TTS Models: Comparing Zero-Shot and Fine-tuning Approaches to Personalise TTS in Assistive Communication, Date: Aug. 21, 2025.

(Continued)

*Primary Examiner* — Phong H Nguyen
(74) *Attorney, Agent, or Firm* — CALDWELL LLC

(57) ABSTRACT

An apparatus for automated generation of an optimized media input includes at least a processor and a memory storing instructions configuring the processor to receive media inputs and to generate a structured media index by implementing a mapping pipeline that transforms the media inputs into structured data fields. The processor is further configured to generate audio render artifacts comprising time-aligned waveform files based on enhanced and reconstructed dialogue spans referenced in the structured media index by implementing a blending and loudness-normalization module and to generate alignment-conformed assets based on the audio render artifacts and structured media index. The processor is still further configured to generate an optimized media input based on the alignment-conformed assets, the audio render artifacts, and the structured media index by implementing an orchestration engine configured as a scheduler and dependency resolver.

18 Claims, 7 Drawing Sheets

(56) References Cited

OTHER PUBLICATIONS

Luong et al Nautilus: a Versatile Voice Cloning System arXiv:2005.11004v1 [eess.AS] May 22, 2020.

Huang et al PASE: Phoneme-Aware Speech Encoder to Improve Lip Sync Accuracy for Talking Head Synthesis arXiv:2504.05803v3 [cs.GR] Oct. 15, 2025.

* cited by examiner

APPARATUS FOR AND METHOD OF AUTOMATED GENERATION OF AN OPTIMIZED MEDIA INPUT

FIELD OF THE INVENTION

The present invention generally relates to the field of speech enhancement, voice cloning/TTS, phoneme-level synthesis, audio-visual alignment, and metadata-driven post-production automation. In particular, the present invention is directed to an apparatus for and method of automated generation of an optimized media input.

BACKGROUND

Traditional media workflows fragment ingest, transcription, metadata generation, alignment, and audio processing across disparate tools: manual or standalone transcription engines produce rudimentary tags or XML/JSON indexes; NLP-based mapping pipelines may identify speakers and spans but typically stop before producing time-aligned, enhanced waveform artifacts; audio toolkits can denoise and normalize to ITU-R BS.1770/EBU R128 yet require separate alignment and lack linkage to structured indexes; forced aligners yield timecodes but are not coupled to orchestration or provenance; and generic DAG schedulers (for example, Airflow/Luigi) coordinate tasks but do not provide media-specific modules for dialogue reconstruction, blending with loudness normalization, or generation of alignment-conformed assets tied to a unified index.

SUMMARY OF THE DISCLOSURE

In an aspect, an apparatus for automated generation of an optimized media input includes at least a processor and a memory communicatively connected to the at least a processor, wherein the memory contains instructions configuring the at least a processor to receive media inputs, generate a structured media index, wherein generation of the structured media index includes implementing a mapping pipeline configured to transform the media inputs into structured data fields, generate audio render artifacts based on enhanced and reconstructed dialogue spans referenced in the structured media index, wherein generation of the audio render artifacts includes implementing a blending and loudness-normalization module, wherein the audio render artifacts comprise at least time-aligned waveform files, generate alignment-conformed assets based on the audio render artifacts and structured media index, and generate an optimized media input based on the alignment-conformed assets, audio render artifacts, and structured media index, wherein generation of the optimized media input includes implementing an orchestration engine configured as a scheduler and dependency resolver.

In another aspect, a method of automated generation of an optimized media input includes receiving, by a processor, media inputs, generating, by the processor, a structured media index, wherein generation of the structured media index includes implementing a mapping pipeline configured to transform the media inputs into structured data fields, generating, by the processor, audio render artifacts based on enhanced and reconstructed dialogue spans referenced in the structured media index, wherein generation of the audio render artifacts includes implementing a blending and loudness-normalization module, wherein the audio render artifacts comprise at least time-aligned waveform files, generating, by the processor, alignment-conformed assets based on the audio render artifacts and structured media index, and generating, by the processor, an optimized media input based on the alignment-conformed assets, audio render artifacts, and structured media index, wherein generation of the optimized media input includes implementing an orchestration engine configured as a scheduler and dependency resolver.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
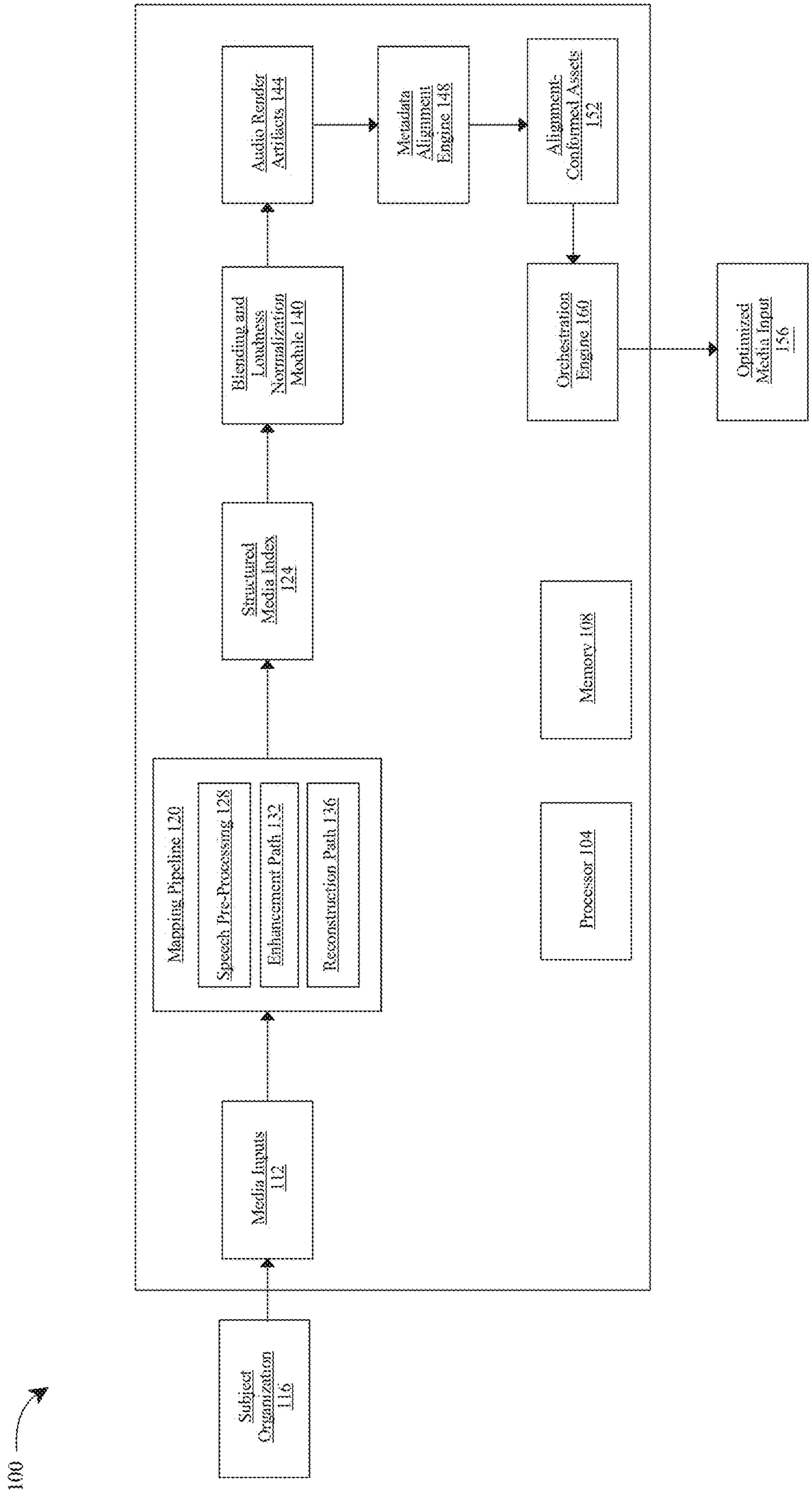
FIG. 1 is an exemplary embodiment of an apparatus for automated generation of an optimized media input.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems, apparatuses and methods for producing an optimized media input from degraded or inconsistent dialogue recordings by combining enhancement, selective phoneme-level reconstruction, and timeline conformance under explicit guardrails. In an embodiment, processor may orchestrate an end-to-end processing pipeline that may include a mapping pipeline to construct a structured media index, a speech pre-processing module and degradation-detection engine, an enhancement path, a reconstruction path, a blending and loudness-normalization module, a metadata alignment engine, and an optional music/ambience integration module, and may emit a Provenance-Linked Conformed Output Set (PLCOS) while preserving provenance and reproducibility.

Aspects of the present disclosure can be used to restore intelligibility and naturalness of dialogue in video projects while maintaining speaker timbre and lip-sync within a defined tolerance. Aspects of the present disclosure can also be used to generate alignment-conformed captions/subtitles, mix-ready stems (DX/MX/FX and optional ambience), and high-resolution mixed masters suitable for distribution, as well as to support adjacent use cases such as audio-only programs, multilingual dubbing, and low-latency webinar enhancement. This is so, at least in part, because the apparatus may couple a versioned Structured Media Index (capturing diarization, CTMs, prosody, quality metrics, scene/shot ranges, model lineage, and control curves) with a policy layer and model registry that may select and parameterize enhancement and reconstruction models under quality guardrails (for example, intelligibility non-regression, timbre-similarity thresholds, and lip-sync elasticity limits), thereby enabling deterministic, provenance-preserving decisions per segment.

Aspects of the present disclosure allow for measurable, auditable improvements over conventional workflows, including increased signal-to-noise ratio and predicted intelligibility (for example, STOI/PESQ proxies), bounded lip-sync residuals, and stable or improved ASR word-error rates, while maintaining non-destructive edit history and consent/watermark controls for speaker-conditioned synthesis. In some embodiments, processor 104 may scale from single-workstation to clustered execution with containerized services and reproducible seeds, may record all model identifiers, parameters, and outcomes to the Structured Media Index, and may assemble PLCOS as the externally consumable, distribution-ready suite that may be traceably linked to the original media inputs and the decisions that produced the final result.

Disclosed embodiments provide a practical, technical improvement over fragmented media workflows by unifying ingest, indexing, enhancement, reconstruction, alignment, and delivery into a single, deterministic framework. In contrast to separate tools that generate transcripts, timecodes, or loudness-normalized files in isolation, the apparatus introduces a mapping pipeline that builds a structured media index; an orchestration engine that executes model-backed stages under pinned checkpoints; enhancement and phoneme-level reconstruction pathways governed by objective guardrails (for example, intelligibility non-regression, timbre similarity, lip-sync tolerance); and a metadata alignment engine that maintains frame-accurate conformance across edits. This integration yields time-aligned, provenance-linked outputs (for example, mix-ready stems, alignment-conformed captions, and a high-resolution master) that are reproducible via recorded seeds, checksums, and model lineage. Practically, the system replaces ad hoc, manual retiming and re-mixing with an end-to-end, auditable process that reduces failure modes (caption drift, lip-sync errors, timbre mismatch) and shortens iteration cycles. Associated features describing these improvements-including the structured media index, orchestration engine, metadata alignment engine, and PLCOS—are detailed in the sections that follow and are referenced at each stage where the corresponding technical benefit is realized.

Exemplary embodiments illustrating aspects of the present disclosure are described below in the context of several specific examples.

Referring now to FIG. 1, an exemplary embodiment of an apparatus 100 for automated generation of an optimized media input is illustrated. Apparatus 100 may include circuitry such as without limitation a processor 104 communicatively connected to a memory 108; for instance, circuitry may include and/or be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 is configured to receive media inputs 112 associated with at least video production on behalf of a subject organization 116. For the purposes of this disclosure, a "subject organization" is any entity for whom audio-visual assets are created, processed, or distributed. Non-limiting examples of subject organization 116 include companies, non-profits, educational institutions, government agencies, production houses, and sole proprietors operating as a business entity. A subject organization 116 may act directly (for example, uploading its own recordings) or indirectly through authorized contributors such as creative agencies, freelance editors, production vendors, or platform integrators granted permission to provide media inputs 112 and metadata to the apparatus.

With continued reference to FIG. 1, in some embodiments, processor 104 receives media inputs 112 from both user-facing and machine-facing channels. For the purposes of this disclosure, a "user interface" is an interactive software surface, such as a web portal, desktop application, or mobile application, enabling authorized users to submit files and descriptors. The user interface may support drag-and-drop uploads, folder selection, ingest presets, and form fields for project descriptors including production title, scene and shot lists, and microphone notes. In some embodiments, processor 104 also exposes an application programming interface (API) for programmatic submissions from asset management systems, cloud storage connectors, or non-linear editing (NLE) export plug-ins. API endpoints may accept media assets and metadata via multipart uploads or signed object-store references, and may provide callbacks or webhooks to signal ingest completion and validation results. Access to the user interface and the API may be governed by authentication and authorization controls associated with the subject organization 116. For the purposes of this disclosure, "media inputs" are machine-readable files and metadata records containing audio, video, and timing information suitable for ingestion into an apparatus. Media inputs 112 may include, as non-limiting examples, a raw video file (for example, MP4, MOV/QuickTime, MXF, or Matroska), an associated mixed audio track embedded within the video container or supplied as a separate file (for example, WAV or AIFF), optional dialogue/music/effects stems, available transcripts, captions, or scripts, optional shot and scene lists, camera and microphone metadata, and pre-existing editorial timeline artifacts such as an edit decision list (EDL) or OpenTimelineIO (OTIO) bundle. In some embodiments, processor 104 may accept these media inputs 112 either directly through the user interface or indirectly through the API, associates each input with the corresponding project for the subject organization 116, and maintains a non-destructive ingest record.

With continued reference to FIG. 1, in some embodiments, processor 104 may validate and normalize media inputs 112 prior to downstream processing. Validation may include verifying container integrity, confirming codec support, detecting variable frame rate, confirming that caption timecodes fall within picture duration, and ensuring that stems are sample-accurate with respect to the reference video. Normalization may include transcoding audio to a common uncompressed format, converting frame rates to a canonical time base for internal calculations, and reconciling reel identifiers across camera and audio records to maintain referential integrity. Processor 104 may further record the identity of the submitting party (for example, a user acting on behalf of the subject organization 116 or an API client credential) in an ingest log to support auditing and reproducibility. As a non-limiting example workflow, a project administrator for the subject organization 116 may sign in to a secure web portal and upload a raw interview video, separate dialogue and music stems, and a caption file. In parallel, a production vendor integrated via the API may submit an OTIO file referencing source clips stored in a cloud bucket under the organization's account. Processor 104 associates the portal uploads and the API-submitted references with the same project, parses the OTIO to construct the sequence timeline, verifies that the caption cues align to the sequence duration, and binds camera and microphone metadata to the corresponding streams. The resulting unified manifest is then persisted for use by subsequent enhancement, reconstruction, and alignment stages.

With continued reference to FIG. 1, in some embodiments, validation may be performed by a validation engine that may include a container profiler, a codec profiler, a timestamp auditor, and a caption conformance checker. For the purposes of this disclosure, a "container profiler" is a software and/or hardware component that parses structural headers of a media input. It may parse structural headers of a media input (for example, QuickTime atoms, MXF descriptors, or Matroska EBML elements) to confirm track counts, index tables, and declared durations. A "codec profiler" is a component that inspects elementary-stream headers. It may inspect elementary stream headers (for example, AAC ADTS frames, PCM fmt chunks, H.264 SPS/PPS units, or ProRes frame headers) to verify sample rate, bit depth, channel layout, frame size, and profile/level declarations. A "timestamp auditor" is a component that traverses presentation timestamps (PTS) and decode timestamps (DTS) to detect negative, non-monotonic, or discontinuous sequences and to confirm the presence and correctness of the time base for variable-frame-rate material. It may traverse presentation timestamps (PTS) and decode timestamps (DTS) to detect negative, non-monotonic, or discontinuous sequences. A "caption conformance checker" is a component that validates caption/subtitle files such that cue start/stop times fall within picture duration, are monotonic, and comply with format rules (e.g., line length and non-overlap for SubRip or WebVTT). It may validate that cue start and stop times may fall within picture duration, may be monotonic, and may comply with format-specific rules (for example, line length and overlap constraints for SubRip or WebVTT). By way of example, a MOV file may be rejected if the container profiler may detect a missing moov atom, if the codec profiler may detect a declared 48 kHz PCM stream with actual 44.1 kHz block alignment, or if the timestamp auditor may detect a variable frame rate track without a time base declaration.

With continued reference to FIG. 1, in some embodiments, normalization may be performed by a normalization module that may include a timebase resolver, a resampling unit, a channel mapper, and a loudness analyzer. For the purposes of this disclosure, a "time base" is a rational frame-rate representation (for example, 24000/1001 for 23.976 fps) used to convert between frame counts and real time. The timebase resolver may convert source-specific time bases and timecodes (for example, drop-frame versus non-drop-frame) into a canonical internal representation to align all media inputs 112. The resampling unit may convert audio sample rates (for example, 44.1 kHz to 48 kHz) using a polyphase or windowed-sinc algorithm, and may optionally apply noise-shaped dithering when reducing bit depth. The channel mapper may transform arbitrary layouts (for example, dual-mono, stereo, 5.1) into a target layout, while preserving dialogue phase coherence. The loudness analyzer may compute integrated loudness and true peak according to ITU-R BS. 1770 and may record measured LUFS values to inform downstream processing. By way of example, a stereo dialogue stem at 44.1 kHz may be upsampled to 48 kHz, dithered to 24-bit PCM, remapped to a dual-mono dialogue layout, and normalized to a reference loudness range prior to analysis.

With continued reference to FIG. 1, in some embodiments, the validation engine may incorporate machine-learning components to detect subtle defects that rule-based checks may miss. A container anomaly classifier may accept byte-level header excerpts and timing summaries and may output a probability of structural corruption (for example, orphaned chunk tables or inconsistent edit lists). A timestamp drift regressor may model cumulative PTS drift over program length and may flag media inputs 112 likely to exhibit audio-video desynchronization under naive concatenation. A caption-audio alignment scorer may employ a lightweight speech model to align a short audio excerpt to supplied captions and may report an alignment confidence; segments below a threshold may be queued for correction. As a non-limiting example, a media input may be technically decodable yet may trigger the container anomaly classifier when header-index mismatches may correlate with historical ingest failures.

With continued reference to FIG. 1, in some embodiments, integrity verification may include cryptographic hashing and continuity checks. Processor 104 may compute and store one or more of MD5, SHA-1, or SHA-256 hashes per file and may compute rolling checksums per segment to support partial retransmission. Byte-range verification may be used when media inputs 112 may be referenced via signed object-store locators, allowing processor 104 to confirm that retrieved ranges may match expected offsets from an edit decision list or an OpenTimelineIO reference. In an exemplary workflow, a 60-minute PCM file may be validated by hashing fixed-size blocks (for example, 8 MiB), storing block hashes in an ingest manifest, and rechecking only the blocks required by the timeline, thereby reducing validation latency.

With continued reference to FIG. 1, in some embodiments, normalization may address variable frame rate and sample-clock drift. The timebase resolver may detect variable frame rate by analyzing deltas between successive video PTS values and may resample or retime audio to maintain sample-accurate sync to the resolved sequence time base. For the purposes of this disclosure, "sample-accurate" is an alignment within one audio sample at the working sample rate. Where camera and external recorder clocks may drift, processor 104 may apply time-stretch within a bounded factor (for example, +1000 ppm) using a phase-coherent algorithm to align slate clap transients or detected synchronization markers across the program. As an example, a dual-system shoot may exhibit a 240 ms offset increasing linearly over 30 minutes; normalization may apply a small, continuous time-stretch to the dialogue stem so that transient features (for example, consonant plosives) may remain aligned to picture cuts.

With continued reference to FIG. 1, in some embodiments, normalization may include channel layout reconciliation and metadata unification. The channel mapper may inspect Broadcast WAV iXML and bext chunks, as well as container-level labels, to resolve ambiguous track designations (for example, differentiating dual-mono from true stereo by inter-channel correlation). Ambiguous or missing labels may be inferred using a track-role classifier that may consider spectral content, speech probability, and spatial cues to assign likely roles (for example, dialogue, music, effects). A metadata unifier may consolidate camera and microphone metadata fields into a canonical schema (for example, normalizing manufacturer-specific tags), and may attach provenance tags to each media input for auditing. As a concrete example, a dialogue stem incorrectly labeled "stereo music" may be relabeled when the track-role classifier may detect persistent speech with high intelligibility and low inter-channel decorrelation.

With continued reference to FIG. 1, in some embodiments, caption normalization and conformance may be performed to ensure downstream alignment quality. The caption conformance checker may correct malformed cues (for example, overlapping intervals) and may re-encode captions to a canonical format with explicit time units. An optional language-ID model may verify that caption language may match the detected speech language in the associated dialogue region. When captions may lack word-level timing, processor 104 may produce provisional word cues by distributing durations proportionally to word lengths within each caption interval, while recording that such timings may be provisional in the ingest manifest. As an example, captions supplied at 29.97 fps with drop-frame timecodes may be converted to non-drop-frame sequence time and then exported with millisecond precision for internal processing.

With continued reference to FIG. 1, in some embodiments, the validation engine and the normalization module may write a non-destructive ingest manifest that may enumerate each media input, measured technical properties, detected anomalies, normalization actions taken, and any machine-learning model identifiers and versions invoked. The manifest may include, as non-limiting examples, measured LUFS and true-peak values, time-stretch factors applied, resampling parameters, channel-mapping decisions, caption corrections performed, and alignment confidence scores. This manifest may enable processor 104 to reproduce the validated and normalized state deterministically, to revert specific steps, or to branch alternative normalization strategies without modifying original media inputs 112.

With continued reference to FIG. 1, in some embodiments, processor 104 may map validated media inputs 112 into structured data fields to enable deterministic processing and auditability. This organization step may include creating a project-scoped registry that records, for each media input, its identity, stream layout, time base and timecode relationships to other media inputs 112, and any validation or normalization actions applied, such that downstream modules may reference a single, versioned source of truth for reproducible processing.

With continued reference to FIG. 1, in some embodiments, processor 104 may execute a mapping pipeline 120 that may transform validated media inputs 112 into structured data fields to enable deterministic processing and auditability. A "mapping pipeline" may include orchestrated sequence of stages that may include (i) organizing technical and provenance details for each media input, (ii) constructing a Media Manifest, and (iii) generating analysis tables that may decompose media inputs 112 into time-indexed structures. The mapping pipeline 120 may be modular—supporting different technical embodiments for each stage—while remaining versioned and non-destructive so that downstream modules may reproduce or branch prior states without altering original media inputs 112. The final output of the mapping pipeline 120 may be referred to as a structured media index 124. For the purposes of this disclosure, a "structured media index" is a project-scoped compilation that may contain the media manifest, all analysis tables produced by the mapping pipeline 120, and associated provenance (including model identifiers and versions), such that subsequent enhancement, reconstruction, alignment, mixing, and export stages may reference a single source of truth.

With continued reference to FIG. 1, for the purposes of this disclosure, "mapping pipeline" is a component that denotes the orchestrated sequence of ingest-organization, Media Manifest construction, and analysis-table generation described above. For clarity, "analysis table" is a structured, time-indexed dataset produced by a designated engine within the mapping pipeline 120. "CTM" entries may denote token identities (for example, words or phonemes), start times, durations, and confidences expressed in sequence time. "Confidence" is a scalar likelihood derived from a model-specific calibration procedure (for example, temperature scaling on a held-out validation set) and may be used by downstream stages to gate decisions.

With continued reference to FIG. 1, within the mapping pipeline 120, a diarization engine may be provided to segment dialogue in a media input by putative speaker. For the purposes of this disclosure, a "diarization engine," is software and/or hardware component executable configured to partition an input dialogue signal into homogeneous, time-indexed regions attributed to putative speakers. A diarization engine may include a voice-activity detector, a speaker-embedding extractor (for example, x-vector or d-vector networks), and a clustering module (for example, agglomerative hierarchical clustering with a probabilistic linear discriminant analysis back-end). Training data for the diarization engine may comprise multi-speaker corpora that may include conversational interviews, panel discussions, and narration with overlapping speech, curated across microphones (for example, lavalier, shotgun, boom), environments (for example, office, studio, exterior), and languages to promote generalization. Data augmentation may include additive background noise (for example, HVAC, traffic), convolution with room-impulse responses to simulate reverberation, and speed perturbations within bounded factors to emulate clock drift. Embedding extractors may be trained to minimize speaker-classification loss on large speaker-ID sets and may be fine-tuned with metric-learning objectives (for example, additive angular margin softmax) to improve cluster separation; operating thresholds for clustering may be calibrated by held-out development splits to yield confidence values persisted to the structured media index 124.

With continued reference to FIG. 1, within the mapping pipeline 120, an ASR and alignment engine may be provided to generate an automatic speech recognition transcript and to assign time boundaries to tokens. For the purposes of this disclosure, an "ASR and alignment engine," is a software and/or hardware component configure to convert speech contained in a media input into text. ASR and alignment engine may include a CTC- or transducer-based decoder for initial hypotheses and a lattice-constrained aligner (for example, a weighted finite-state transducer or dynamic-time-warping over phoneme sequences) for boundary refinement. Training data for this engine may include read and conversational speech with human-verified transcripts; clean studio recordings may be mixed with field recordings exhibiting reverberation and background noise to increase robustness. For forced alignment, phoneme-level supervision may be obtained from corpora with time-aligned phonetic transcriptions or synthesized via grapheme-to-phoneme front-ends validated against pronunciation dictionaries. Duration models may be regularized to enforce plausible phoneme lengths (for example, vowel versus stop-consonant priors). In non-limiting examples, contextual biasing may be used to handle code-switching and proper nouns common to a subject organization 116 when transcripts/captions/scripts may be supplied. Resulting word- and phoneme-level CTMs with confidences may be written to the structured media index 124.

With continued reference to FIG. 1, within the mapping pipeline 120, a quality metrics engine may be provided to estimate intelligibility and signal integrity for segments of a media input. For the purposes of this disclosure, a "quality metrics engine," is a software and/or hardware component configured to estimate intelligibility and signal integrity of a media input over time-indexed windows and segments. A quality metrics engine may compute signal-to-noise ratio, root-mean-square level, dynamic range, crest factor, and perceptual-quality proxies (for example, neural estimators of PESQ or STOI where reference signals may be unavailable). Training data for perceptual proxies may include paired clean/noisy utterances with human mean-opinion scores or side-by-side preference annotations; regression losses may be used against objective scores when references may be available and distilled for no-reference inference. A noise-profiling submodule may initialize with spectral-subtraction baselines and adapt via unsupervised models (for example, non-negative matrix factorization priors) to separate quasi-stationary noise from speech. Segments exhibiting SNR below a configurable threshold, excessive crest factor indicative of clipping, or predicted intelligibility below a target may be flagged in the structured media index 124 to inform downstream enhancement or reconstruction.

With continued reference to FIG. 1, within the mapping pipeline 120, a prosody extractor may be provided to derive suprasegmental cues aligned to CTMs. For the purposes of this disclosure, a "prosody extractor" may produce F0 trajectories, energy envelopes, and duration vectors aligned to the ASR transcript. Training data for neural pitch estimators may include multi-speaker corpora with ground-truth F0 trajectories obtained from laryngograph or high-quality references where available, supplemented with manual corrections to reduce octave errors. Models may be trained with mixed loss terms (for example, regression toward continuous F0 and voicing classification) and evaluated on held-out microphones to ensure device invariance. Duration aggregation may rely on CTM token boundaries; where phoneme-level CTMs may be absent, durations may be distributed across phonemes using learned grapheme-to-phoneme duration priors. Prosody contours with confidence bands may be persisted to the structured media index 124 so that downstream reconstruction may relax pitch-matching constraints in low-confidence regions.

With continued reference to FIG. 1, within the mapping pipeline 120, a scene and shot analyzer may be provided to recover scene and shot ranges for a media input. For the purposes of this disclosure, a "scene and shot analyzer" is software and/or hardware component configured to infer, validate, and record scene and shot ranges for a media input. A scene and shot analyzer may detect cuts using content-based features (for example, histogram deltas, structural-similarity indices) and short-window motion cues (for example, optical-flow discontinuities), and may reconcile detections with editorial artifacts referenced in the Media Manifest (for example, an edit decision list or OpenTimelineIO). Training data for cut detection and scene grouping may include professionally edited sequences with ground-truth cut lists and scene annotations; script alignment may be supervised by datasets where script headings and on-screen scenes may be aligned by editorial logs, with heuristics (for example, character-name frequency, dialogue density) refined using weak supervision. Where editorial artifacts may be present, the analyzer may treat them as authoritative and may use content-based detection primarily for validation and gap-filling. Resulting scene/shot ranges and reconciliation metadata may be recorded in the structured media index 124.

With continued reference to FIG. 1, as non-limiting technical examples within the mapping pipeline 120: (i) a 48 kHz dialogue stem may be diarized into alternating speaker segments with median 12-second turns and 0.92 median confidence; (ii) an ASR and alignment engine may emit word-level CTMs with median 35 ms boundary error and phoneme-level CTMs for vowels and stops when a grapheme-to-phoneme front-end may be available; (iii) a quality metrics engine may report SNR of 9 dB over a noisy HVAC span and may predict a STOI proxy of 0.62, triggering a reconstruction policy; and (iv) a prosody extractor may output an F0 contour ranging 105-128 Hz with low voicing confidence over music-under regions, which may be recorded so that reconstruction may rely more heavily on duration matching than pitch tracking in those intervals. All such artifacts, together with Media Manifest fields and provenance (for example, model identifiers and versions, hashes, and submission identifiers), may be persisted within the structured media index 124 to serve as the single, versioned source of truth for subsequent stages.

With continued reference to FIG. 1, in some embodiments, processor 104 may employ a speech pre-processing module 128 that may operate on artifacts referenced by the structured media index 124 produced by the mapping pipeline 120. For the purposes of this disclosure, a "speech pre-processing module" is software and/or hardware component configured to standardize, segment, and annotate dialogue portions of a media input prior to enhancement or reconstruction. A speech pre-processing module may consume, as inputs, dialogue stems, diarization segments, word- and phoneme-level CTMs, prosody contours, quality metrics, and scene or shot ranges recorded in the structured media index 124, and may emit normalized, analysis-ready dialogue regions with auxiliary tags for downstream decision-making. The speech pre-processing module 128 may include, without limitation, an automatic speech recognition and forced-alignment submodule, a speaker-diarization submodule, a noise-profiling submodule, a band-limitation detector, a voice-activity-detection (VAD) gate, and an optional double-talk detector. Outputs from these submodules may be written back to the structured media index 124 as additional fields or tables with stable references to originating media inputs 112 and sequence time.

With continued reference to FIG. 1, an automatic speech recognition and forced-alignment submodule may be provided within the speech pre-processing module 128 to refine token timing prior to enhancement or reconstruction. This submodule may reuse the ASR and alignment engine introduced in the mapping pipeline 120, but may be configured for light-weight passes that may (i) confirm or tighten word boundaries in regions where the quality metrics table may indicate adequate intelligibility, and (ii) generate provisional tokens in regions lacking transcripts. Training data and decoding behavior may be as described for the mapping pipeline 120, and updated CTMs with confidence values may replace or augment prior entries in the structured media index 124 with versioning preserved.

With continued reference to FIG. 1, a speaker-diarization submodule may be provided within the speech pre-processing module 128 to reconcile speaker turns with downstream gating and policy decisions. The submodule may reuse embeddings and clusters produced by the diarization engine in the mapping pipeline 120 and may re-segment or smooth boundaries to align with word-level CTMs and scene or shot ranges. As non-limiting examples, short speaker intrusions during interviewer prompts may be collapsed, and off-camera prompts may be tagged so that enhancement parameters may differ by speaker role. Updated diarization segments with confidence calibrations may be appended to the structured media index 124.

With continued reference to FIG. 1, a noise-profiling submodule may be provided to estimate stationary and transient noise characteristics conditioned on scene or shot ranges. For the purposes of this disclosure, "noise profiling" is a software and/or hardware module that estimates, over time-indexed regions, the spectral and temporal characteristics of non-speech content present in a media input and writes those estimates to the structured media index. Noise profiling may denote estimation of spectral and temporal noise signatures that may be used to parameterize denoisers and to weight intelligibility scores. The noise-profiling submodule may leverage the quality metrics table (for example, SNR and crest-factor statistics) and may compute per-segment noise models that may include spectral envelopes, modulation spectra, and impulsive-noise markers. Training data for learned noise estimators may include paired clean and noisy recordings with annotated noise types; profiles may be persisted to the structured media index 124 for reuse by enhancement modules.

With continued reference to FIG. 1, a band-limitation detector may be provided to identify dialogue regions captured with insufficient bandwidth (for example, telephone-grade or heavily low-pass-filtered capture). For the purposes of this disclosure, "band-limitation detection" is the process of estimating the effective upper-band energy and spectral roll-off of a dialogue region to determine whether bandwidth-extension models are applicable. Band-limitation detection may refer to estimating effective upper-band energy and spectral roll-off to determine whether bandwidth-extension models may be applicable. The band-limitation detector may compute spectral flatness, roll-off frequencies, and learned embeddings that may correlate with perceived bandwidth; results may be stored in the structured media index 124 as per-segment flags and estimated cutoff frequencies.

With continued reference to FIG. 1, a voice-activity-detection gate may be provided to generate reliable speech masks that may govern downstream processing windows. For the purposes of this disclosure, "VAD gating" is the per-frame (or per-hop) decision process that labels each analysis frame of a dialogue signal as speech-present or speech-absent, optionally with a calibrated probability, and applies those labels to enable or disable downstream processing on that frame. The VAD gate may combine classical energy-based features with a neural posterior and may be conditioned on diarization segments to reduce false alarms from non-target speakers. The resulting masks may be written as frame-indexed arrays referenced by time ranges in the structured media index 124.

With continued reference to FIG. 1, an optional double-talk detector may be provided for interviews or b-roll to identify overlapping speech between speakers. For the purposes of this disclosure, "double-talk detection" is the classification of analysis frames in which more than one speaker is simultaneously active. The double-talk detector may use cross-correlation features between diarized channels, entropy of posterior speaker assignments, and rapid-turn features to tag overlapping spans. These tags may be recorded in the structured media index 124 and may influence later blending and reconstruction choices.

With continued reference to FIG. 1, in some embodiments, processor 104 may further employ a degradation-detection engine that may classify segments of a media input according to restoration difficulty. For the purposes of this disclosure, a "degradation-detection engine" is a software and/or hardware component that aggregates multiple objective scorers to identify dialogue spans requiring correction. It may aggregate scorers that may include SNR thresholds, perceptual-quality deltas relative to targets (for example, proxies of PESQ or STOI), automatic speech recognition word-error-rate spikes relative to neighboring context, clipping or overload indicators derived from crest factor and true-peak exceedances, and reverberation time estimates (for example, T60 derived from decay-rate models). The degradation-detection engine may read required features and prior metrics from the structured media index 124, may compute additional scorers where needed, and may emit a segment-level table of degradation labels with justification codes and confidence values.

With continued reference to FIG. 1, the degradation-detection engine may include a flagging policy classifier that may assign each analyzed span one of three actions: Enhance, Reconstruct, or Pass-through. For the purposes of this disclosure, a "flagging policy classifier" is a supervised or semi-supervised model trained to map scorer vectors and contextual cues to an action label subject to constraints. Training data for the flagging policy classifier may include curated segments labeled by expert mixers for best-practice remediation, augmented with synthetic degradations (for example, added HVAC noise, artificial reverberation, dynamic range compression, and band-limitation). Features may include the scorers described above, speaker role, prosody stability, scene or shot identifiers, and lip-sync sensitivity inferred from CTM density. The resulting action labels and confidences may be appended to the structured media index 124.

With continued reference to FIG. 1, the speech pre-processing module 128 and the degradation-detection engine may use and update the structured media index 124 throughout execution. In a non-limiting example workflow, the speech pre-processing module 128 may (i) tighten word boundaries in low-noise regions, (ii) smooth diarization at shot boundaries, (iii) compute noise profiles for each shot, (iv) flag telephone-grade spans via the band-limitation detector, and (v) produce VAD masks and double-talk tags. The degradation-detection engine may then (vi) compute intelligibility deltas versus target, (vii) identify clipping at crowd-applause peaks, (viii) estimate T60 above a threshold in a reflective room, and (ix) label segments as Enhance, Reconstruct, or Pass-through with confidences. All intermediate and final artifacts may be written to the structured media index 124 with model identifiers and versions, thereby enabling subsequent enhancement and reconstruction stages to query consistent, time-aligned context without reprocessing the underlying media inputs 112.

With continued reference to FIG. 1, in some embodiments, processor 104 may employ an enhancement path 132 that may operate on artifacts recorded in the structured media index 124 to improve intelligibility and listenability while preserving the original character of a speaker. For the purposes of this disclosure, an "enhancement path" is a sequence of restoration stages that may include neural denoising, dereverberation, bandwidth extension, equalization, and de-essing, each conditioned on context previously written to the structured media index 124 by the mapping pipeline 120 and the speech pre-processing module 128 (for example, diarization segments, noise profiles, band-limitation flags, prosody contours, and voice-activity masks). Outputs of the enhancement path 132 may be committed back to the structured media index 124 as versioned dialogue renders and per-segment parameter traces, thereby enabling deterministic A/B comparison and downstream reconstruction decisions.

With continued reference to FIG. 1, within the enhancement path 132, a neural denoising engine may be provided to reduce stationary and transient noise while preserving speech content. For the purposes of this disclosure, a "neural denoising engine" is a time-frequency masking model (for example, a residual or UNet-style architecture) that ingests magnitude or complex spectrogram patches together with conditioning vectors derived from the structured media index 124 (for example, scene or shot identifiers and noise-profile descriptors). Training data may include paired clean/noisy utterances synthesized by mixing consented clean speech with curated noise libraries (for example, HVAC, crowd murmur, keyboard clicks) under a range of signal-to-noise ratios; augmentations may include room-impulse convolutions to expose the model to mild reverberation. Losses may include magnitude reconstruction, complex consistency, and auxiliary intelligibility proxies (for example, differentiable STOI-like terms). The neural denoising engine may emit denoised spectrogram estimates that may be resynthesized to waveforms and written to the structured media index 124 with per-frame gain masks and confidence values.

With continued reference to FIG. 1, within the enhancement path 132, a dereverberation engine may be provided to reduce late reverberation that may degrade clarity in reflective environments. For the purposes of this disclosure, a "dereverberation engine" is a weighted prediction error (WPE) module and an optional neural dereverberation module. The WPE module may estimate linear prediction filters over short windows to suppress late reflections; hyperparameters (for example, prediction delay and filter length) may be selected using reverberation-time (T60) estimates recorded in the structured media index 124 by the degradation-detection engine. The neural module may learn residual correction on top of WPE using training data comprising clean speech convolved with measured room-impulse responses and mixed with ambient noise. Losses may include early-late energy ratio targets and speech-consistency penalties. The dereverberation engine may write updated waveforms, filter coefficients, and residual-error summaries to the structured media index 124.

With continued reference to FIG. 1, within the enhancement path 132, a bandwidth-extension engine may be provided to restore high-frequency content when the band-limitation detector may indicate narrowband capture. For the purposes of this disclosure, a "bandwidth-extension engine" is a software and/or hardware component executable by processor 104 that synthesizes missing upper-band speech energy for band-limited dialogue. A bandwidth-extension engine may synthesize missing upper-band energy using a conditional generative model (for example, a spectral-domain diffusion decoder or a lightweight autoregressive predictor) conditioned on low-band features and prosody contours recorded in the structured media index 124. Training data may include wideband speech downsampled to telephone-grade bandwidth with the original wideband signal used as supervision; losses may include multi-resolution STFT reconstruction and perceptual spectral distance. The bandwidth-extension engine may write an estimated cutoff frequency, synthesized upper-band spectral slices, and confidence scores to the structured media index 124 along with the wideband-restored dialogue render.

With continued reference to FIG. 1, within the enhancement path 132, an equalization and de-essing module may be provided to correct tonal imbalances and reduce sibilant harshness. For the purposes of this disclosure, an "equalization and de-essing module" is a parametric equalizer whose targets may be selected using speaker-dependent priors and scene-conditioned noise profiles, and a sibilant-band dynamic processor keyed by prosody and VAD masks to avoid pumping during non-speech regions. Training data for auxiliary recommenders that may predict EQ starting points may include human-curated mixes paired with measured spectral tilts; optimization may minimize spectral error to curated references while respecting loudness guardrails. The module may record applied EQ curves, de-esser thresholds, and gain-reduction traces to the structured media index 124.

With continued reference to FIG. 1, the enhancement path 132 may enforce a timbre-preservation constraint to maintain the perceived identity of the speaker after processing. For the purposes of this disclosure, a "timbre-preservation constraint" is a requirement that embeddings extracted from pre-enhancement and post-enhancement dialogue remain similar within a tolerance. A timbre-embedding extractor may be provided that may compute speaker-conditioned embeddings (for example, x-vector or d-vector representations) using a network trained on speaker-ID corpora with metric-learning objectives. During enhancement, processor 104 may evaluate embedding similarity (for example, cosine similarity) between corresponding pre/post segments referenced in the structured media index 124; if similarity may fall below a threshold, processor 104 may attenuate aggressive settings (for example, relax denoiser masks or sibilant attenuation). Embedding vectors and similarity scores may be appended to the structured media index 124 as part of the decision log.

With continued reference to FIG. 1, quality guardrails may be provided to ensure that enhancement operations may not reduce intelligibility or introduce objectionable artifacts. For the purposes of this disclosure, "quality guardrails" includes (i) a non-destructive A/B buffer that may retain pre-enhancement and post-enhancement dialogue segments for frame-aligned comparison; (ii) revert thresholds based on intelligibility and recognition proxies (for example, predicted STOI/PESQ deltas, ASR word-error-rate changes when re-decoding enhanced audio using the ASR and alignment engine, and spectral distance to the original within speech-active frames); and (iii) clip-safety checks using true-peak estimation and crest-factor limits. If any guardrail may be violated, processor 104 may revert the affected span to a less aggressive preset or may route the span to the reconstruction path 136. Guardrail outcomes and revert reasons may be recorded in the structured media index 124 with justification codes.

With continued reference to FIG. 1, enhancement-parameter selection may be conditioned on context already present in the structured media index 124. As non-limiting examples, diarization segments may drive speaker-specific presets; scene or shot identifiers may select dereverberation aggressiveness based on T60 statistics; band-limitation flags may gate bandwidth-extension activation; prosody contours may modulate de-esser time constants to track sibilant onsets; and VAD masks may gate all processors to speech-active frames only. Parameter trajectories (for example, denoiser mask strengths, WPE filter lengths, de-esser gain-reduction) may be serialized to the structured media index 124 as time-aligned control curves to support later audit and reproduction.

With continued reference to FIG. 1, as a non-limiting technical example, a dialogue segment recorded in a reflective conference room may be processed as follows: (i) the neural denoising engine may reduce HVAC noise by 8 dB while preserving consonant transients; (ii) the dereverberation engine may shorten late-reverb decay by 250 ms based on a T60 estimate previously written to the structured media index 124; (iii) the bandwidth-extension engine may be bypassed because the band-limitation detector may report a wideband capture; (iv) the equalization and de-essing module may apply a gentle low-shelf and 4-7 kHz de-essing keyed to prosody; (v) the timbre-preservation constraint may verify cosine similarity ≥0.92 between pre/post embeddings; and (vi) quality guardrails may confirm improved intelligibility via a +0.07 predicted STOI delta and neutral ASR word-error-rate. The enhanced render, parameter traces, and guardrail metrics may be added to the structured media index 124 for use by subsequent alignment, blending, and export stages.

With continued reference to FIG. 1, in some embodiments, processor 104 may employ a reconstruction path 136 that may operate on artifacts recorded in the structured media index 124 when enhancement alone may be insufficient to achieve target intelligibility or quality. For the purposes of this disclosure, a "reconstruction path" is a sequence of phoneme-level synthesis stages that may (i) generate content and durations from aligned text, (ii) synthesize speech conditioned on a speaker embedding, and (iii) match prosody to maintain lip-sync and speaker character, subject to (iv) safety and identity controls. The reconstruction path 136 may consume, as inputs, word- and phoneme-level CTMs, prosody contours, diarization segments, VAD masks, scene or shot ranges, band-limitation flags, and degradation labels written to the structured media index 124 by the mapping pipeline 120 and speech pre-processing module 128. Outputs of the reconstruction path 136 may be committed back to the structured media index 124 as versioned, time-aligned dialogue renders together with per-span provenance and control parameters.

With continued reference to FIG. 1, within the reconstruction path 136, a content and duration generator may be provided to derive phoneme sequences and per-phoneme durations for spans selected for reconstruction. For the purposes of this disclosure, a "content and duration generator" is a software and/or hardware component that accepts, as inputs, the ASR transcript with forced alignment (word- and/or phoneme-level CTMs) and, when available, a script supplied by the subject organization 116, and produces phoneme sequences with per-phoneme duration targets for spans selected for reconstruction. A content and duration generator may accept as inputs the ASR transcript with forced alignment and, when available, a script supplied by the subject organization 116. Where tokens may be out-of-vocabulary (OOV), a grapheme-to-phoneme (G2P) component may be applied to predict phoneme sequences; for the purposes of this disclosure, "G2P" is a model that may map graphemes to phonemes using sequence-to-sequence or finite-state transduction. Duration targets may be obtained from phoneme-level CTMs where present; otherwise, the generator may allocate durations by distributing the word-level time proportionally across predicted phonemes using learned duration priors (for example, longer vowels than stop consonants) and may bound deviations using constraints recorded in the structured media index 124 for lip-sync tolerance (for example, +40 ms per word). Training data for G2P may include pronunciation dictionaries and domain-specific lexicons (for example, organizational names), while duration priors may be learned from corpora with phonetic time alignments. The generator may write the finalized phoneme sequence and target durations to the structured media index 124 as a reconstruction plan for each span.

With continued reference to FIG. 1, within the reconstruction path 136, a speaker-embedding retriever may be provided to obtain an embedding that may condition voice characteristics during synthesis. For the purposes of this disclosure, a "speaker embedding" is a fixed-length vector (for example, x-vector or d-vector) that may summarize timbral attributes of a speaker as estimated from reference utterances. The speaker-embedding retriever may read diarization segments from the structured media index 124, select high-confidence, low-noise excerpts for the target speaker (for example, the on-camera subject), and compute an embedding using a network trained on speaker identification tasks with metric-learning objectives. In some embodiments, a fine-tuned voice-cloning profile may be available for the subject organization 116; in such cases, the retriever may return the profile identifier together with an embedding hash as provenance. Embeddings and provenance hashes may be written to the structured media index 124 for auditability and downstream timbre-preservation checks.

With continued reference to FIG. 1, within the reconstruction path 136, a text-to-speech (TTS) and vocoder stack may be provided to synthesize waveform audio for the target phoneme spans. For the purposes of this disclosure, "TTS" is a conditional acoustic model that may map phoneme sequences with durations (and optional prosody controls) to an intermediate acoustic representation (for example, mel-spectrograms), while a "vocoder" is the process of a neural decoder (for example, autoregressive, flow-based, or diffusion-based) that may convert acoustic representations to time-domain waveforms. The TTS may be conditioned on the speaker embedding and may accept phoneme sequence, per-phoneme duration targets, and optional F0 and energy trajectories derived from the structured media index 124. Training data for the TTS and vocoder may include multi-speaker corpora with balanced gender, accent, and device diversity; supervision may include mel-spectrograms paired with ground-truth audio and, where available, phoneme-level alignments and F0 tracks. Losses may include reconstruction losses (for example, L1 on mel), duration adherence penalties, and adversarial or perceptual objectives to improve naturalness. The synthesized spans may be exported as time-aligned waveforms and written back to the structured media index 124 with model identifiers and synthesis parameters.

With continued reference to FIG. 1, within the reconstruction path 136, a prosody-matching controller may be provided to match pitch, energy, and timing to the original delivery or to apply a target style selected for the subject organization 116. For the purposes of this disclosure, "prosody matching" is the process of adjusting F0, energy, and micro-timing to remain within lip-sync and style tolerances. The controller may read prosody contours (F0, energy) and CTMs from the structured media index 124, fit local pitch curves over each reconstructed span (for example, cubic-spline or piecewise-linear fits), and apply duration-elastic constraints that may cap deviation from target token durations (for example, at most ±5-10 percent per phoneme, subject to a word-level ±40 ms tolerance). When original prosody may be unreliable (for example, low voicing confidence over music-under), the controller may interpolate from neighboring high-confidence regions or apply a project-level prosody template (for example, "calm instructional") stored for the subject organization 116. The controller may record applied pitch shifts, energy envelopes, and duration adjustments to the structured media index 124 as control curves.

With continued reference to FIG. 1, to ensure continuity between reconstructed spans and neighboring enhanced originals, a reconstruction blender may be provided to splice synthesized audio into the dialogue track. For the purposes of this disclosure, a "reconstruction blender" is the process of boundary detection at phoneme edges, align zero crossings, and apply cross-fades and spectral-matching EQ to minimize boundary artifacts. The blender may consult VAD masks, diarization segments, and scene or shot ranges from the structured media index 124 to avoid splicing across cut points or speaker changes. The blender may write cross-fade durations, EQ adjustments, and loudness normalization parameters to the structured media index 124 together with the rendered composite dialogue stem.

With continued reference to FIG. 1, safety and identity controls may be provided to govern authorization and provenance for speaker-conditioned synthesis. Safety and identity controls may include (i) consent and authorization flags that may be associated with the subject organization 116 and specific speakers; (ii) embedding provenance hashes that may bind a given speaker embedding to the source diarization segments and media inputs 112 referenced in the structured media index 124; and (iii) an optional watermark inserter that may embed an imperceptible token into reconstructed spans for forensic detection. The reconstruction path 136 may be gated such that synthesis for a speaker may proceed only when authorization flags may be present in project metadata; otherwise, spans may be routed to enhancement-only processing or omitted. All control decisions and watermark parameters may be persisted to the structured media index 124.

With continued reference to FIG. 1, quality guardrails analogous to those in the enhancement path 132 may be applied to reconstructed audio. The reconstruction path 136 may compute timbre-similarity metrics between synthesized spans and reference embeddings (for example, cosine similarity above a threshold), intelligibility proxies (for example, predicted STOI or PESQ), and recognition stability (for example, ASR word-error-rate should not increase relative to the transcript). If any guardrail may be violated, processor 104 may (i) relax prosody-matching strength within tolerance, (ii) re-synthesize with alternative TTS checkpoints or speaker embeddings, or (iii) fall back to enhancement-only for the affected span. Guardrail outcomes, including revert reasons and alternative attempts, may be added to the structured media index 124.

With continued reference to FIG. 1, as a non-limiting technical example, for a ten-word sentence recorded with severe HVAC noise and clipped consonants, the degradation-detection engine may have labeled words 3-6 for reconstruction. The content and duration generator may produce a phoneme sequence with durations derived from word-level CTMs and G2P for one OOV acronym; the speaker-embedding retriever may compute an embedding from high-confidence segments preceding the noisy span; the TTS and vocoder stack may synthesize the four-word region with durations constrained to +8 percent and F0 guided by neighboring contours; the prosody-matching controller may nudge two vowels by −20 ms to maintain lip-sync; the reconstruction blender may cross-fade 25 ms at each boundary and apply subtle EQ to match room tone; safety controls may log authorization for the speaker and embed a watermark token; and guardrails may confirm cosine similarity ≥0.90 and a +0.10 STOI proxy delta. The resulting composite dialogue, control curves, provenance hashes, and render identifiers may be written to the structured media index 124 for subsequent alignment, mixing, and export.

With continued reference to FIG. 1, training data for engines within the mapping pipeline 120 may be curated to cover capture variability and editorial contexts while preserving consent and licensing constraints. For the diarization engine, corpora may include multi-speaker recordings spanning interviews, panel discussions, and narrated segments with overlapping speech, collected across microphones (for example, lavalier, shotgun, boom), environments (for example, office, studio, exterior), languages, and speaker demographics; augmentation may include additive noise (HVAC, traffic), room-impulse convolutions, and speed perturbations, with speaker-ID labels for classification pretraining and metric-learning fine-tuning. For the ASR and alignment engine, datasets may include read and conversational speech with human-verified transcripts, mixed from clean studio and field recordings exhibiting reverberation and background noise; lexicon resources and grapheme-to-phoneme dictionaries may be included for forced alignment supervision, with contextual biasing lists covering proper nouns and terminology common to a subject organization; evaluation splits may target boundary accuracy at word/phoneme granularity. For the quality metrics engine's perceptual proxies, paired clean/noisy utterances with objective scores (for example, PESQ/STOI where references exist) and human ratings (mean-opinion or side-by-side preferences) may be assembled; regression targets may be distilled for no-reference inference and calibrated on held-out data. For the prosody extractor, multi-speaker corpora with ground-truth F0 traces (for example, laryngograph or high-quality pitch references) and aligned durations may be used, supplemented with manual correction of octave errors; device diversity (microphones/codecs) may be emphasized to ensure invariance. For the scene and shot analyzer, professionally edited sequences with ground-truth cut lists, scene annotations, and aligned scripts may be collected; training items may cover varied transition types (cuts, dissolves, wipes), motion regimes, and grading conditions, with weak supervision (for example, character-name density, dialogue intensity) refined against editorial logs. Where applicable, a noise-profiling baseline set may include labeled noise types (for example, HVAC, traffic, wind, handling) with boundary annotations to learn stationarity and spectral-tilt characteristics. All datasets may include metadata descriptors (capture chain, sample rate, language, license/consent) recorded alongside model checkpoints in the model registry, and summary lineage for each emitted analysis table may be written to the structured media index 124 to support reproducibility and audit.

With continued reference to FIG. 1, in some embodiments, processor 104 may employ a blending and loudness-normalization module 140 that may operate on enhanced or reconstructed dialogue spans referenced in the structured media index 124 and may emit external render artifacts as outputs, for example audio render artifacts as described further below. For the purposes of this disclosure, "blending" is the process of joining adjacent dialogue regions so that transitions may be imperceptible, and "loudness normalization" is the process of adjusting gain to meet a project target (for example, −16 LUFS for stereo web deliverables) without clipping or adverse dynamics. The module may read, from the structured media index 124, segment boundaries, CTMs, VAD masks, diarization segments, scene or shot ranges, per-span parameter traces, and measured pre-normalization loudness and true-peak values. The audio render artifacts 144 produced by this module may be separate from the structured media index 124, while metadata describing how they were produced may be written back into the structured media index 124 as versioned records that reference the external assets by stable identifiers. For the purposes of this disclosure, "audio render artifacts" are time-aligned waveform files generated by processor 104 during blending and loudness normalization (for example, PCM WAV at the project sample rate and channel layout), suitable for downstream alignment, mixing, and export. Non-limiting examples may include: a composite dialogue stem that may join enhanced and reconstructed spans; an enhanced-only dialogue preview; reconstructed-span spot renders for A/B comparison; alternate takes rendered under different guardrail decisions; loudness-normalized prints meeting a specified target (for example, −16 LUFS with a −1 dBTP ceiling); and an optional mix-prep package comprising the composite dialogue stem together with serialized control-curve sidecars (for example, boundary indices, crossfade envelopes, EQ parameters, gain offsets) and a normalization log.

With continued reference to FIG. 1, a boundary locator may be provided to determine crossfade regions between adjacent dialogue segments. For the purposes of this disclosure, a "boundary locator" is a software component configured to align transitions to zero crossings and may bias boundaries toward low-energy phoneme edges using CTMs and VAD masks recorded in the structured media index 124. Candidate windows (for example, 10-50 ms) around phoneme boundaries may be scored for energy minima and zero-crossing density; selected crossfade spans, time indices, and zero-crossing offsets may be persisted as boundary annotations in the structured media index 124. The corresponding audio crossfades may be applied to produce an external render artifact and may not be embedded in the structured media index 124 itself.

With continued reference to FIG. 1, a spectral-matching equalizer may be provided to reduce timbral discontinuities across boundaries. For the purposes of this disclosure, a "spectral-matching equalizer" estimates average spectral tilt and room-tone signature on each side of a boundary (for example, using short-time spectral envelopes and stationary-noise statistics from noise profiles) and may apply gentle corrective equalization so that spectra may converge within a tolerance. A room-tone synthesizer may be provided to extend ambience across short gaps by sampling stationary-noise statistics previously written to the structured media index 124. Applied EQ curves, room-tone segment identifiers, and gain values may be recorded as metadata in the structured media index 124, while the equalized, room-tone-conformed audio may be emitted as part of an external render artifact.

With continued reference to FIG. 1, a loudness-normalization engine may be provided to adjust dialogue levels to a project target while preserving intelligibility and headroom. For the purposes of this disclosure, a "loudness-normalization engine" is an engine that computes integrated loudness and true peak per ITU-R BS.1770 and may apply dialog-anchored gating so that measurement and correction may be restricted to speech-active frames indicated by VAD masks and diarization segments. The engine may compute a gain offset to reach the target LUFS and may apply look-ahead limiting to maintain a configured true-peak ceiling (for example, −1 dBTP). Pre/post LUFS, gain offsets, gating masks used, and true-peak margins may be logged in the structured media index 124; the normalized waveform may be produced as an external render artifact separate from the index.

With continued reference to FIG. 1, an artifacts detector may be provided to identify objectionable processing artifacts and to trigger safe fallbacks. For the purposes of this disclosure, an "artifacts detector" is a classifier that may detect musical noise, phasiness, transient smearing, and limiter pumping that may arise from denoising, dereverberation, crossfades, or aggressive dynamics. Features may include modulation-spectra irregularities, spectral-kurtosis spikes around crossfades, and inter-frame phase variance, combined with a lightweight neural backend trained on curated pairs of clean and artifact-laden speech. Detector decisions and confidence scores may be attached to affected spans as metadata in the structured media index 124 and may govern fallback behavior during rendering.

With continued reference to FIG. 1, guardrail fallbacks may be provided when the artifacts detector or loudness checks may exceed thresholds. For the purposes of this disclosure, "guardrail fallbacks" are predefined corrective actions when artifact-detection or loudness-conformance checks exceed thresholds. Guardrail fallbacks may include (i) reducing crossfade durations or shifting boundaries to alternate zero crossings, (ii) relaxing spectral-matching strength or substituting synthesized room tone when tonal mismatch may be severe, (iii) softening limiter ratios or adjusting target LUFS within an allowed tolerance band (for example, +1 LU), and (iv) reverting an affected span from reconstructed audio to an enhanced original. All fallback choices and revert rationales may be written as justification codes in the structured media index 124, while the corrected audio may continue to be produced as an external render artifact.

With continued reference to FIG. 1, outputs of the blending and loudness-normalization module 140 may be emitted as external deliverables while remaining traceable through the structured media index 124. For the purposes of this disclosure, a "composite dialogue stem" is the time-aligned audio render that may result from crossfades aligned to zero crossings, spectral matching (including room tone where applicable), and loudness normalization to the project target. Optionally, a "mix-prep package" may be emitted that may include the composite dialogue stem, control-curve sidecars (for example, serialized boundary indices, crossfade envelopes, EQ parameters, and gain offsets), and a normalization log summarizing pre/post integrated loudness, dialog-gate masks used, and true-peak margins. The composite dialogue stem and any mix-prep package may be separate from the structured media index 124; the structured media index 124 may retain authoritative metadata and provenance-boundary annotations, EQ settings, room-tone sources, loudness corrections, artifact-detector scores, guardrail outcomes, and stable identifiers—that reference these external outputs for downstream alignment, mixing, and export.

With continued reference to FIG. 1, training data for the blending and loudness-normalization module 140 may be curated to learn boundary placement, spectral matching, and gain trajectories that produce imperceptible transitions while maintaining conformance to loudness targets. For boundary localization and crossfade design, corpora may include aligned pairs of adjacent dialogue regions drawn from interviews, narration, and documentary footage where expert mixers have annotated preferred join points and fade shapes. Features may include zero-crossing density, local phase continuity, transient scores, and token-level CTMs from the structured media index 124; targets may include crossfade start/stop times, fade curves (for example, equal-power vs. equal-gain), and boundary offset corrections. Spectral-match equalization may be trained on source/target timbre pairs (same speaker, different capture chains or processing paths) with supervision given by matched EQ curves and room-tone profiles; losses may combine multi-resolution STFT error with perceptual band weighting to discourage over-correction.

With continued reference to FIG. 1, loudness-normalization and dynamics control may be trained and validated using program segments labeled with ground-truth ITU-R BS.1770 integrated loudness, loudness range, and true-peak measurements computed from high-precision oversampled meters. Datasets may span delivery contexts (for example, web stereo, mobile mono, broadcast) and include speech-over-music cases to learn dialog-anchored gating. The module's loudness estimator may be calibrated against reference meters, while limiter and gain-trajectory predictors may be optimized to hit target LUFS with ≤−1 dBTP ceilings and minimal pumping. Training signals may include measured pre-normalization loudness and true-peak values (from the structured media index 124), speech-activity masks, and per-span headroom statistics; targets may be post-gain trajectories and limiter parameters that meet compliance under guardrail constraints on timbre change (for example, embedding-similarity floors) and intelligibility non-regression (for example, STOI/PESQ proxies).

With continued reference to FIG. 1, artifact detection and guardrail policy learning may rely on side-by-side A/B corpora and human-rated annotations for defects such as musical noise, phasiness, zippering at joins, and over-limited transients. An artifacts detector may be trained as a classifier on spectral-temporal features and neural embeddings to produce per-span defect probabilities; calibration may use temperature scaling on held-out mixes. Guardrail fallback policies may be learned using logged outcomes from prior renders: inputs may include boundary indices, crossfade curves, EQ deltas, loudness offsets, limiter actions, and artifact probabilities; targets may be accepted parameter revisions or revert decisions recorded by reviewers. The resulting models may propose corrective actions (for example, boundary shift to nearest stable zero-crossing, crossfade length reduction, spectral-match relaxation, limiter softening, or reversion from reconstructed to enhanced original), which are executed by the module and written back to the structured media index 124 as versioned metadata linked to the emitted audio render artifacts.

With continued reference to FIG. 1, in some embodiments, processor 104 may employ a metadata alignment engine 148 that may operate on artifacts recorded in the structured media index 124 and on external audio render artifacts 144 (for example, a composite dialogue stem) to ensure frame-accurate conformance between audio and picture across edits and exports. For the purposes of this disclosure, a "metadata alignment engine" is software configured to perform a sequence of stages that may (i) parse editorial timelines, (ii) model timecode relationships among source, sequence, and export domains, (iii) micro-retime audio events to remain within a lip-sync tolerance window, (iv) regenerate captions/transcripts with corrected timings, and (v) persist alignment across re-renders. The metadata alignment engine 148 may write alignment metadata back to the structured media index 124 (for example, mapping tables, error statistics, revision tags) and may emit alignment-conformed assets 152 as external outputs defined below.

With continued reference to FIG. 1, within the metadata alignment engine 148, a timeline modeler may be provided to interpret editorial artifacts and to construct a timecode graph. For the purposes of this disclosure, a "timeline modeler" is model configured to parse an edit decision list or OpenTimelineIO (OTIO). It may build a directed mapping from source timecodes to sequence time and to export time, maintaining reel identifiers and timebase conversions (for example, drop-frame versus non-drop-frame, 24000/1001 versus 25). The timeline modeler may reconcile clip in/out points, transitions, and retimes, and may attach stable clip globally unique identifiers (GUIDs) recorded in the Media Manifest. The resulting timecode graph, conversion parameters, and GUID mappings may be stored in the structured media index 124 as alignment metadata; however, any remapped media assets produced by downstream stages may be external to the index.

With continued reference to FIG. 1, within the metadata alignment engine 148, a micro-retiming and lip-sync controller may be provided to constrain word- and phoneme-level offsets to a tolerance window (for example, ≤+40 ms). For the purposes of this disclosure, "micro-retiming" is the process of bounded adjustments to event timings to maintain alignment with on-screen articulation and edits. The controller may read word/phoneme CTMs and prosody contours from the structured media index 124, align them to sequence time via the timecode graph, and may apply dynamic time warping across phoneme sequences to minimize boundary error subject to per-token elasticity limits (for example, +5-10 percent duration). A CTC back-check may be performed by re-decoding short windows with a constrained recognizer to verify that post-retime audio remains consistent with the intended text. Retiming deltas, residual errors, and acceptance confidences may be recorded in the structured media index 124; any retimed audio renders (for example, splice-accurate dialogue snippets) may be emitted as alignment-conformed assets 152.

With continued reference to FIG. 1, a caption and transcript conformer may be provided to regenerate subtitle files with corrected timings. For the purposes of this disclosure, a "caption and transcript conformer" is a model configured to convert CTMs aligned to sequence or export time into caption formats (for example, SRT or WebVTT) while preserving cue identifiers across edit revisions. The conformer may apply dialog-anchored gating so that silence or music-under intervals may not produce spurious cues, may enforce format constraints (for example, maximum line lengths and non-overlapping cues), and may carry forward original cue IDs or assign stable hashes that remain consistent across minor editorial changes. Regenerated caption files may be emitted as alignment-conformed assets 152 separate from the structured media index 124; the structured media index 124 may store caption manifests (for example, file identifiers, checksums, language tags, and cue-ID equivalence maps).

With continued reference to FIG. 1, a persistence layer may be provided to maintain alignment across subsequent renders and editorial updates. For the purposes of this disclosure, a "persistence layer" is a component uses stable clip GUIDs, clip-source checksums, and EDL/OTIO revision hashes to detect whether editorial changes may affect prior alignment decisions. When changes may be detected, the metadata alignment engine 148 may reapply micro-retiming only to affected intervals and may update alignment metadata with new revision tags, leaving unaffected spans untouched. The persistence layer may therefore enable incremental regeneration of alignment-conformed assets 152 while maintaining a verifiable chain of custody in the structured media index 124.

With continued reference to FIG. 1, outputs of the metadata alignment engine 148 may be distinct from the structured media index 124 and from prior audio render artifacts 144. Alignment-conformed assets may include, as non-limiting examples: (i) a timeline-retimed dialogue snippet set or a retimed version of the composite dialogue stem (when bounded time-warp is applied), (ii) regenerated SRT or WebVTT caption files with preserved cue identifiers, (iii) an alignment report that may summarize per-segment lip-sync error statistics, retiming deltas, and residual misalignments, and (iv) an optional edit-mapping sidecar (for example, JSON) that may serialize the timecode graph, clip GUIDs, and retime operations applied. These assets may be external deliverables; the structured media index 124 may retain the authoritative mapping tables, error statistics, revision hashes, and stable identifiers that reference the assets.

With continued reference to FIG. 1, training data for the metadata alignment engine may comprise paired editorial artifacts and audiovisual evidence that together describe how dialogue, captions, and picture relate across ingest, sequence, and export domains. Corpora may include projects with authoritative edit decision lists and OpenTimelineIO files, source and sequence renders at known timebases, composite dialogue stems and isolated snippets, and caption sidecars with verified cue identifiers. Labels and targets may include source to sequence to export time mappings, per-token word and phoneme boundaries in sequence time, lip-sync residuals scored by human raters, and caption conformity indicators such as overlap violations and reading-speed thresholds. Datasets may span mixed frame rates, drop-frame and non-drop-frame timebases, variable-frame-rate material, retimes and speed ramps, transitions, and multi-reel assemblies so that learned components generalize to real editorial conditions.

With continued reference to FIG. 1, augmentation for the metadata alignment engine may include synthetic edit deltas (clip insertions, trims, slip/slide operations), bounded time-warps applied to dialogue regions, injected clock drift, and caption perturbations that shift or compress cue boundaries, thereby creating before/after pairs with known alignment fixes. Weak supervision signals may include face-landmark-derived viseme sequences, on-screen lower-thirds timings, and slate/take slugs, which may be aligned to dialogue tokens to supply cross-modal constraints. Calibration sets may measure tolerance-window adherence (for example, percent of tokens within +40 ms), cumulative drift across splice points, caption overlap rates, and stability of cue identifiers across revisions; these metrics may be logged per split to the model registry together with checkpoint hashes and configuration snapshots.

With continued reference to FIG. 1, privacy and compliance safeguards for the metadata alignment engine's training data may include consent records for any person-identifiable media, redaction or blurring of faces where visual supervision is used, and encryption at rest and in transit. Each dataset item may carry descriptors such as capture chain, sample rate, frame rate, language, license terms, and revision lineage; these descriptors may be recorded in the model registry and summarized in the structured media index so that any alignment decision can be traced to specific training conditions. Evaluation may report per-segment lip-sync residual distributions, caption conformance scores, time-base-conversion accuracy, and re-render reproducibility under seeded conditions, with thresholds used by the engine written back as versioned policy parameters.

With continued reference to FIG. 1, as a non-limiting technical example, the metadata alignment engine 148 may parse an OTIO with mixed 23.976 and 29.97 sources, construct a timecode graph with drop-frame conversions, constrain phoneme offsets to within +32 ms via dynamic time warping, confirm text consistency through a CTC back-check at each splice, regenerate WebVTT captions preserving original cue IDs, and emit an alignment report indicating median lip-sync error of 18 ms; all mapping tables, residuals, and revision tags may be recorded in the structured media index 124, while the retimed dialogue render, Web VTT file, and mapping sidecar may be emitted as alignment-conformed assets 152.

With continued reference to FIG. 1, in some embodiments, processor 104 may provide an optional music and ambience integration module that may operate after alignment to produce mix-ready stems. For the purposes of this disclosure, a "music and ambience integration module" is a module of processors that (i) apply side-chain ducking keyed to speech energy, (ii) shape the noise floor for continuity, and (iii) generate deliverables that may comply with common post-production practices (for example, separate dialogue (DX), music (MX), and effects (FX) stems).

With continued reference to FIG. 1, within the music and ambience integration module, a side-chain ducking controller may be provided to reduce music or ambience levels during speech. For the purposes of this disclosure, "side-chain ducking" is the process of dynamic gain reduction applied to non-dialogue content using a control signal derived from speech energy and VAD masks recorded in the structured media index 124. The controller may apply look-ahead attack and program-dependent release, with thresholds modulated by prosody contours to avoid pumping at sibilant onsets. Ducking envelopes and applied gain-reduction traces may be logged to the structured media index 124 as metadata; the resulting music/ambience renders may be external stems.

With continued reference to FIG. 1, a noise-floor shaper may be provided to establish a consistent ambience bed underneath dialogue. For the purposes of this disclosure, a "noise-floor shaper" is a component that synthesizes or extends room tone using stationary-noise statistics recorded earlier (for example, those attached to noise profiles in the structured media index 124) and may apply crossfades at shot boundaries to avoid perceptual discontinuities. Parameters (for example, spectrum tilt and modulation depth) may be stored as metadata in the structured media index 124; the ambience bed may be emitted as an external stem.

With continued reference to FIG. 1, the music and ambience integration module may emit external deliverables distinct from the structured media index 124 and from earlier dialogue renders. For the purposes of this disclosure, "mix-ready stems" are external, timeline-conformed audio render artifacts that segregate program content into standard delivery buses and are ready for final mix or distribution. Stems may include, without limitation: (i) a dialogue (DX) stem (for example, the composite dialogue stem or its alignment-retimed counterpart), (ii) a music (MX) stem with side-chain ducking applied, (iii) an effects (FX) stem conformed to the timeline, and (iv) an optional ambience bed. A "mix-compliance log" is a machine-readable companion record generated by processor 104 that summarizes technical conformance and control trajectories for the mix-ready stems over the full program. It may accompany these stems and may summarize gain-reduction statistics, true-peak margins, integrated loudness per stem, and any guardrail fallbacks invoked. The structured media index 124 may retain references (identifiers, hashes, paths/URIs) and control metadata (ducking envelopes, room-tone sources), while the stems and logs may be delivered as external assets for final mixing and export.

With continued reference to FIG. 1, as a non-limiting technical example, the module may read the composite dialogue stem and the subject organization 116's licensed music track, compute a speech-energy control signal from VAD-gated regions, apply 6-9 dB of program-dependent ducking during voiced segments with a 20 ms look-ahead and 250 ms release, synthesize a consistent office room tone across a two-shot sequence, and output DX, MX, and ambience stems meeting a −16 LUFS dialog anchor and a −1 dBTP ceiling. Ducking envelopes, room-tone identifiers, and compliance statistics may be recorded in the structured media index 124; the stems and a mix-compliance log may be emitted as external, mix-ready deliverables.

With continued reference to FIG. 1, in some embodiments, processor 104 may provide an optional music and ambience integration module that may operate after alignment and blending to create mix-ready deliverables while preserving dialogue intelligibility. For the purposes of this disclosure, a "music and ambience integration module" is a module of processors and controllers that (i) apply side-chain ducking keyed to speech energy, (ii) shape the noise floor for perceptual continuity across edits, and (iii) emit legally conventional deliverables (for example, dialogue (DX), music (MX), and effects (FX) stems). The module may read, from the structured media index 124, VAD masks, diarization segments, prosody contours, scene or shot ranges, noise profiles, measured loudness/true-peak values, and alignment metadata, and may reference external audio render artifacts 144 such as a composite dialogue stem and alignment-conformed assets 152. Outputs of this module may be emitted as external stems and logs; the structured media index 124 may record the corresponding control metadata and stable identifiers.

With continued reference to FIG. 1, within the music and ambience integration module, a side-chain ducking controller may be provided to reduce non-dialogue content during speech. For the purposes of this disclosure, "side-chain ducking" is the process of dynamic gain reduction applied to a target bus (for example, the music or ambience bus) using a control signal derived from speech energy on the dialogue bus. The controller may generate a control envelope by combining short-term RMS/peak measures gated by VAD masks with prosody cues (for example, F0 and energy onsets) written in the structured media index 124. Attack, hold, and release may be program-dependent and may be bounded to avoid pumping (for example, look-ahead 10-30 ms; release 150-400 ms modulated by prosody). In some embodiments, an envelope recommender may be trained on human-mixed references (paired dialogue/music stems and engineer-authored ducking moves) to predict starting parameters; training data may include diverse genres and loudness targets so that learned priors may generalize across projects. The controller may log per-segment gain-reduction traces, thresholds, and time constants as metadata in the structured media index 124 while applying gain to the MX (and optionally FX/ambience) buses in the emitted stems.

With continued reference to FIG. 1, a noise-floor shaper may be provided to create a consistent ambience bed beneath dialogue and across cuts. For the purposes of this disclosure, a "noise-floor shaper" is a component that synthesizes or extends room tone using stationary-noise statistics (for example, spectrum tilt, modulation depth) derived from noise profiles stored in the structured media index 124. The shaper may place crossfades at shot boundaries, align to zero crossings, and bias spectral content toward the scene's measured bed (for example, office HVAC or street hush) so that ambience may remain perceptually continuous when dialogue gaps or editorial trims may otherwise produce dead air. Parameters (for example, target noise floor, spectral emphasis, modulation constraints) and source identifiers for room-tone segments may be recorded in the structured media index 124; the ambience bed may be emitted as an external stem.

With continued reference to FIG. 1, FX accommodation may be provided so that transient or diegetic effects may remain intelligible while still respecting dialogue prominence. For the purposes of this disclosure, "FX accommodation" is the process of selective attenuation or protection of effects regions using event tags and crest-factor guards. The module may read effects annotations (when available) or infer FX-heavy regions using transient density and spectral sparsity; during strong dialogue passages, the module may cap FX gain reduction to a threshold or route those regions through a parallel band-limited duck to preserve impact. FX guardrails, including maximum gain-reduction per event and true-peak protection margins, may be logged as metadata; resulting FX stems may be emitted externally.

With continued reference to FIG. 1, the music and ambience integration module may emit deliverables that may be distinct from the structured media index 124 and from earlier dialogue renders. For the purposes of this disclosure, "mix-ready stems" are external, timeline-conformed audio render artifacts produced by processor 104 that partition program content into standard delivery buses. Buses may include, without limitation: (i) a dialogue (DX) stem (for example, the composite dialogue stem or its alignment-retimed counterpart), (ii) a music (MX) stem with side-chain ducking applied according to speech-energy envelopes, (iii) an effects (FX) stem conformed to the timeline with FX accommodation applied where applicable, and (iv) an optional ambience bed. A "mix-compliance log" is a machine-readable companion record. It may accompany these stems and may summarize integrated loudness per stem, true-peak margins (for example, ≤−1 dBTP), gain-reduction statistics (for example, ducking depth distribution), and any guardrail fallbacks. The structured media index 124 may store references (identifiers, hashes, URIs) to these stems and logs, together with serialized control curves (for example, ducking envelopes, ambience parameters), while the stems and logs themselves may remain external deliverables.

With continued reference to FIG. 1, as a non-limiting technical example, processor 104 may read a composite dialogue stem and a licensed music track, compute a speech-energy envelope from VAD-gated dialogue frames with a 20 ms look-ahead, apply 6-9 dB of program-dependent ducking to the music during voiced regions with a 250 ms release shaped by prosody onsets, synthesize an office room-tone bed filling a 140 ms editorial gap across a cut, and cap FX gain-reduction at 3 dB during key diegetic hits. The module may then emit DX, MX, FX, and ambience stems meeting a −16 LUFS dialog anchor and a −1 dBTP ceiling, plus a mix-compliance log. Ducking envelopes, room-tone identifiers, FX guardrails, and compliance statistics may be recorded in the structured media index 124; the stems and log may be delivered as external, mix-ready assets for final mixing and export.

With continued reference to FIG. 1, in some embodiments, processor 104 may generate an optimized media input 156 by orchestrating a directed acyclic graph of processing stages whose intermediate artifacts may be recorded in the structured media index 124 and whose external renders may assemble into the Provenance-Linked Conformed Output Set (PLCOS). For the purposes of this disclosure, an "optimized media input" is a project-scoped, distribution-ready suite of assets that may be content-equivalent to the originally supplied media inputs 112 while reflecting all enhancement, reconstruction, alignment, blending, normalization, and mix integration performed by a processor under documented guardrails and policies. For the purposes of this disclosure, a "Provenance-Linked Conformed Output Set (PLCOS)" is a versioned collection of external media artifacts and companion records-non-limiting examples may include a high-resolution mixed master, isolated and program stems (DX/MX/FX and optional ambience), alignment-conformed captions/subtitles, an alignment report, a project file with non-destructive edit history, and a JSON manifest of metrics and model identifiers—that may be fully referenced by stable identifiers, checksums, and model lineage stored in the structured media index 124. For the purposes of this disclosure, an "orchestration engine" is a scheduler and dependency resolver. It may (i) read the structured media index 124, (ii) select models and presets from a model registry, (iii) construct a render graph over candidate spans (for example, Enhance, Reconstruct, Pass-through), and (iv) commit outputs and provenance. Each node in the render graph may correspond to a model-backed stage (for example, neural denoising engine, dereverberation engine, bandwidth-extension engine, equalization and de-essing module, text-to-speech and vocoder stack, prosody-matching controller, reconstruction blender, loudness-normalization engine, metadata alignment engine 148, side-chain ducking controller, noise-floor shaper). Edges may encode temporal and semantic dependencies (for example, "reconstruction plan→TTS/vocoder→blending→loudness→alignment").

With continued reference to FIG. 1, a scheduler is a subcomponent of the orchestration engine that admits, orders, and dispatches stage executions onto compute resources. It may include priority queues keyed by project and stage class, resource descriptors (CPU, GPU type and count, memory, disk and network I/O budgets), and placement policies with node affinity (for example, vocoder stages on higher-memory GPUs and ASR/aligners co-located with feature caches). It may implement work stealing to balance heterogeneous workers, rate limiting to protect shared storage, and preemption to service urgent spans. It may provide bounded retries with exponential backoff and jitter for transient faults, and it may keep writes idempotent by committing to the structured media index 124 only after checksum-verified artifact availability. To meet latency objectives, it may auto-tune batch sizes or micro-batching, pin GPU clocks where permitted, and enforce per-model latency ceilings while tracking utilization and per-node service-level metrics.

With continued reference to FIG. 1, a dependency resolver is a subcomponent of the orchestration engine that analyzes declared and inferred dependencies among nodes and produces an executable plan. It may include topological sorting, cycle detection, and readiness-set computation based on artifact availability and version pins (for example, a given CTM revision must exist before prosody extraction). It may support dynamic graph expansion such that, when the degradation-detection engine labels a span for reconstruction, the plan inserts content-and-duration generation, text-to-speech, vocoder, blending, and loudness nodes only for that span, while spans labeled for enhancement bypass synthesis. It may elevate guardrails into hard dependencies (for example, reconstruction blocked until consent flags are present), perform capability checks (for example, language and sampling-rate support), and enable speculative execution of inexpensive analyses when inputs are unchanged. It may write plan fingerprints, version pins, and consent checks to the structured media index 124 so later runs replay the same graph deterministically.

With continued reference to FIG. 1, orchestration engine 160 may emit, for each node, a node receipt containing input hashes, checkpoint identifiers, seeds, runtime metrics (latency, accelerator type, memory usage), and quality deltas (for example, predicted STOI/PESQ changes, timbre-similarity scores, lip-sync residuals). Commits may follow a two-phase protocol in which stage completion is marked, receipts are validated, and index patches with stable artifact identifiers are atomically appended. On conflict (for example, a newer revision tag is present), the transaction coordinator may resolve according to lineage policy (keep latest or branch under a new revision ID) and record justification codes. Guardrail evaluators may run as post-conditions on node outputs; when a post-condition fails, the dependency resolver may inject guardrail fallback nodes (for example, boundary shifts, spectral-match relaxation, limiter softening, or reversion from reconstructed audio to enhanced original) and re-plan only the affected spans. This arrangement provides deterministic, auditable execution while optimizing resource use and minimizing unnecessary reprocessing.

With continued reference to FIG. 1, training data for orchestration engine 160 may include of historical execution traces and outcome logs that characterize how render graphs perform under varying inputs, models, and resource conditions. Sources may include per-node receipts (input hashes, checkpoint identifiers, seeds), runtime metrics (queue wait, start-to-finish latency, accelerator type and memory usage, CPU time, I/O throughput), artifact statistics (bytes written, checksum rates, cache-hit and cache-miss events), guardrail outcomes (pass, fallback class, revert), and quality deltas (predicted intelligibility and timbre-similarity changes, lip-sync residuals) written to the structured media index. Targets for learned subcomponents may include placement and batching decisions that minimize makespan, probability of failure for a node configuration, expected cache benefit, optimal retry backoff, and likelihood that speculative precomputations will be reused. Feature sets may combine graph topology descriptors (in-degree, critical-path membership), model and parameter fingerprints, span characteristics (duration, SNR, band-limitation flags), and resource snapshots (GPU memory headroom, storage bandwidth) captured at dispatch time. Datasets may be partitioned by project type and delivery profile (for example, web stereo versus broadcast) to learn context-specific policies, with evaluation reporting service-level adherence (latency quantiles), throughput, cache efficiency, failure-rate reduction, and rollback incidence. Provenance for each trained policy or cost model may be recorded in the model registry, and configuration snapshots and version pins may be referenced from the structured media index to ensure reproducible orchestration decisions.

With continued reference to FIG. 1, a policy layer may be provided to determine, per span, whether the enhancement path 132 or the reconstruction path 136 may be used and how aggressively each may operate. For the purposes of this disclosure, a "policy layer" is a classifier and rule base that. It may consume tables from the structured media index 124 (for example, SNR and intelligibility proxies, band-limitation flags, diarization segments, CTMs, prosody contours, T60 estimates, artifacts-detector scores) and may emit control directives (for example, "apply dereverberation with WPE plus neural residual," "enable bandwidth extension," "route words 37-61 to reconstruction with voice-clone profile X"). The policy layer may be trained on editor- and mixer-curated decisions and may be constrained by guardrails (for example, minimum timbre similarity, maximum allowed retime elasticity, minimum intelligibility delta) to maintain fidelity to the original speaker and picture.

With continued reference to FIG. 1, model selection and parameterization may be mediated by a model registry. For the purposes of this disclosure, a "model registry" is a repository and resolution service that catalogs, versions, and serves machine-learning components used by the apparatus. It may enumerate, for each model family (for example, denoiser, dereverberation, ASR/aligner, prosody extractor, speaker-embedding extractor, TTS, vocoder, artifacts detector, ducking recommender), versioned checkpoints, training-data descriptors, evaluation metrics, and known operating ranges. The orchestration engine 160 may choose a checkpoint based on domain tags recorded in the structured media index 124 (for example, language, microphone type, environment), may pass feature summaries (for example, noise profiles, prosody statistics), and may record chosen checkpoints and seed values to support deterministic reproduction.

With continued reference to FIG. 1, the enhancement path 132 may combine a neural denoising engine, a dereverberation engine, a bandwidth-extension engine, and an equalization and de-essing module under a timbre-preservation constraint. The denoising engine may be a residual or UNet-style spectrogram mask estimator trained on paired clean/noisy speech with room-impulse augmentations; the dereverberation engine may combine weighted prediction error with a neural residual trained on convolved clean speech; the bandwidth-extension engine may be a conditional generative decoder (for example, diffusion or autoregressive) trained to predict upper-band content from narrowband inputs; the equalization and de-essing module may apply parametric EQ and sibilant-band dynamics guided by speaker-dependent priors. A timbre-embedding extractor (for example, x-vector or d-vector, trained on speaker identification corpora) may compute pre/post embeddings; cosine similarity falling below a threshold may cause the policy layer to reduce aggressiveness or to route spans to reconstruction. All intermediate renders and control curves may be persisted as references in the structured media index 124 and may feed blending and loudness-normalization.

With continued reference to FIG. 1, the reconstruction path 136 may generate phoneme-level content and durations, synthesize waveforms conditioned on a speaker embedding, and match prosody within lip-sync constraints. Content and duration generation may use grapheme-to-phoneme models and duration priors; the TTS acoustic model may predict mel-spectrograms conditioned on phonemes, durations, speaker embedding, and optional F0/energy curves; the vocoder (for example, diffusion, flow, or autoregressive) may decode to waveform. A prosody-matching controller may fit local pitch curves and apply duration elasticity (for example, +5-10 percent per phoneme, bounded to +40 ms per word) to preserve alignment. Safety and identity controls may check consent flags, provenance hashes for embeddings, and optional watermarks. Synthesized spans may be blended at phoneme edges using zero-crossing-aligned crossfades, spectral matching, and room tone, then normalized for loudness with dialog-anchored gating.

With continued reference to FIG. 1, alignment to picture may be enforced by the metadata alignment engine 148. A timeline modeler may parse an edit decision list or OpenTimelineIO, may construct mappings among source, sequence, and export timebases, and may attach stable clip GUIDs. A micro-retiming controller may apply dynamic time warping to phoneme sequences under elasticity bounds to maintain a lip-sync tolerance window (for example, ≤±40 ms) and may perform CTC back-checks by re-decoding constrained windows to confirm text consistency. A caption and transcript conformer may regenerate SRT/Web VTT with corrected timings and preserved cue identifiers. Alignment-conformed assets 152 (for example, retimed dialogue renders, captions, alignment reports) may be emitted externally and may be referenced by identifiers in the structured media index 124.

With continued reference to FIG. 1, music and ambience integration may finalize program stems. A side-chain ducking controller may derive a speech-energy envelope from VAD-gated dialogue with look-ahead and prosody-shaped release; a noise-floor shaper may synthesize room tone to maintain perceptual continuity across cuts; optional effects accommodation may protect transient diegetics. The result may be mix-ready stems: dialogue (DX), music (MX), effects (FX), and optionally an ambience bed—each an external asset referenced by the structured media index 124.

With continued reference to FIG. 1, quality assurance and acceptance may be enforced by a verification loop before PLCOS assembly. For the purposes of this disclosure, a "verification loop" is the process of automated checks. It that may include: (i) intelligibility proxies (for example, predicted STOI/PESQ deltas) non-decreasing versus original; (ii) ASR word-error-rate stable or improved when decoding the final dialogue; (iii) timbre-similarity between final dialogue and reference embeddings exceeding a threshold; (iv) lip-sync residuals within tolerance on a per-segment basis; (v) loudness and true-peak conformance (for example, −16 LUFS, ≤−1 dBTP) at program and stem levels; and (vi) artifacts-detector probabilities below revert thresholds. Failures may trigger automatic fallbacks (for example, relax EQ or dereverberation, re-synthesize with an alternate TTS checkpoint, shift crossfade windows) with all outcomes recorded to the structured media index 124.

With continued reference to FIG. 1, PLCOS may then be assembled as the optimized media input 156. For the purposes of this disclosure, "optimized media input" is a content-equivalent, distribution-ready suite of external artifacts. It may denote a content-equivalent, distribution-ready suite that may include: (a) a high-resolution mixed master created from mix-ready stems with alignment applied; (b) an isolated dialogue stem comprising enhanced and reconstructed spans as blended and, if required, retimed; (c) music and effects stems and an optional ambience bed; (d) alignment-conformed captions; (e) an alignment report summarizing per-segment error statistics and retiming deltas; (f) a project file with non-destructive edit history; and (g) a JSON manifest of metrics and model identifiers. Each artifact may be an external file identified by stable locators and checksums, while the structured media index 124 may retain Media Manifest fields, analysis tables, model lineage, control curves, revision hashes, verification results, and cross-references needed to deterministically reproduce PLCOS under the same policies.

With continued reference to FIG. 1, determinism and reproducibility may be ensured by content hashing and seed control. Processor 104 may compute perceptual or byte-level hashes of source media inputs 112, store random seeds per model invocation, and record configuration snapshots (for example, policy thresholds, time-warp bounds, denoiser aggressiveness, ducking parameters) in the structured media index 124. A re-render request may rehydrate the render graph from these records, select identical model checkpoints, and reproduce outputs within numerical tolerance. Where model updates may be desired, alternate PLCOS variants may be created under new registry versions while preserving prior PLCOS instances for audit.

With continued reference to FIG. 1, as a non-limiting technical walk-through, a 6-minute interview with intermittent HVAC and reflective room tone may be processed as follows: the policy layer may mark 18 percent of dialogue time for reconstruction due to clipping and low predicted intelligibility; enhancement may denoise and dereverberate the remainder under a timbre-preservation constraint with cosine similarity ≥0.92; reconstruction may synthesize four multi-word spans with durations constrained to +8 percent and F0 matched via spline fits; blending may apply 20-30 ms zero-crossing-centered crossfades and spectral matching with room tone; loudness normalization may raise integrated program level to −16 LUFS while maintaining-1.2 dBTP; alignment may constrain phoneme offsets to ≤+28 ms and regenerate WebVTT; music ducking may apply program-dependent 6-9 dB reduction during voiced regions; verification may confirm +0.09 STOI proxy delta, stable WER, and artifacts-detector probabilities <0.3 throughout. PLCOS may then be emitted with master, DX/MX/FX/ambience stems, captions, alignment report, project file, and a JSON manifest, all referenced by the structured media index 124 for provenance and re-render.

With continued reference to FIG. 1, in some embodiments, processor 104 may implement a metrics and feedback layer that may capture composition metadata, outcome feedback, and policy-update signals throughout the end-to-end processing pipeline-including the mapping pipeline and subsequent speech pre-processing, enhancement, reconstruction, blending and loudness normalization, metadata alignment, and optional music/ambience integration- and may persist them in the Structured Media Index while summarizing key results in the PLCOS manifest. For the purposes of this disclosure, "composition metadata" is a set of structured records that captures end-to-end provenance and technical context for each processing stage and output. It may include, without limitation: model identifiers and versions invoked at each stage (for example, ASR/alignment, diarization, denoiser, dereverberation, bandwidth extension, TTS/vocoder, artifacts detector, ducking recommender); speaker-embedding hashes used for timbre preservation and reconstruction; phoneme duration maps derived from CTMs; alignment statistics (for example, median/percentile lip-sync residuals and retime deltas); pre/post quality metrics (for example, SNR, predicted PESQ/STOI proxies, integrated loudness, true-peak, and ASR word-error-rate deltas); mix/export parameters (for example, target LUFS, dBTP ceiling, limiter settings); and an edit provenance log of any manual clip-level or parameter overrides. These records may be stored as time-indexed tables and per-render metadata linked to external assets via stable identifiers.

With continued reference to FIG. 1, outcome feedback may be ingested to evaluate segment-level decisions and to drive continuous improvement. For the purposes of this disclosure, "outcome feedback" is the set of human- or analytics-derived annotations used to evaluate segment-level decisions and to drive continuous improvement across the end-to-end processing pipeline. It may include reviewer accept/reject labels per reconstructed or enhanced span, QA taxonomy tags (for example, "sibilance still harsh," "room tone mismatch"), results of controlled A/B comparisons (for example, preference and MOS-style ratings between presets or model checkpoints), and post-publish audience signals when available (for example, completion or rewind rates localized to VO-heavy regions, speech-to-music balance complaints). Processor 104 may attribute outcome feedback to specific spans and models by joining review timestamps and player analytics to the structured media index 124's time ranges and model lineage, producing training-ready logs that may preserve consent and privacy boundaries.

With continued reference to FIG. 1, a continuous-improvement controller may be provided to update policies and model selections using the logged metrics and feedback. For the purposes of this disclosure, a "continuous-improvement controller" is a software and/or hardware component that updates policies and model selections using logged metrics and outcome feedback. It may include (i) auto-tuning routines that may adjust denoiser aggressiveness, dereverberation parameters, and de-esser thresholds based on observed regressions (for example, timbre-similarity dips or artifact detector hits), (ii) prosody-controller calibration that may tighten or relax duration elasticity and F0 tracking when lip-sync residuals may approach tolerance limits, and (iii) candidate re-ranking for reconstruction using bandit or reinforcement-learning objectives trained on accept/reject/A/B outcomes (for example, contextual bandits that may map quality-metric vectors and speaker roles to action choices: Enhance vs. Reconstruct vs. Pass-through). Safety guardrails (for example, minimum timbre-similarity and non-decreasing intelligibility) may constrain all updates. Updated thresholds and model-selection priors may be versioned in the model registry and written to the structured media index 124 to ensure reproducibility.

With continued reference to FIG. 1, in some embodiments, processor 104 may support privacy, security, and compliance controls that may govern access to sensitive artifacts, especially speaker embeddings and reconstructed audio. Access to embeddings and reconstruction profiles may be enforced via per-project scopes and role-based authorization; artifacts and index tables may be encrypted at rest using a key-management system and in transit via mutually authenticated TLS; audit logs may record read/write operations, model invocations, policy changes, and export events with user and client identities. Consent records for enhancement and for speaker-conditioned synthesis may be linked to specific speakers and projects and may gate reconstruction stages; optional watermarking tokens may be embedded into synthesized spans and recorded in the structured media index 124 for later forensic detection. Data-retention and deletion policies may be configurable so that embeddings, renders, and logs may be rotated or purged on request while preserving compliance artifacts (for example, consent proofs and audit summaries).

With continued reference to FIG. 1, alternative embodiments may extend the apparatus to additional production contexts. For audio-only podcasts, processor 104 may omit video-based alignment and may conform dialogue to chapter markers rather than picture cuts, while loudness targets and deliverables may follow podcast standards (for example, dialog-anchored LUFS). For multilingual dubbing, reconstruction may be conditioned on cross-lingual prosody transfer: source-language prosody contours may be mapped into target-language phoneme sequences using language-specific G2P and duration models, while speaker embeddings may switch to target-voice profiles authorized for the subject organization 116. For live or near-real-time webinars, low-latency variants of denoisers, dereverberation, and ASR/aligners may be used (for example, causal UNet blocks, streaming transducers) with bounded-latency VAD and lightweight quality guards; a rolling structured media index 124 shard may back the session and be consolidated post-event. For hybrid deployments, edge processing may ingest and pre-clean on set (for example, VAD gating, noise profiling, basic denoising) while cloud batch jobs may perform reconstruction, alignment, and final mixing.

With continued reference to FIG. 1, in some embodiments, the computing environment may comprise a single machine or a distributed cluster with CPU/GPU mixes, containerized services, and a model registry supporting deterministic execution. Orchestration may use a job-queue and scheduler that may allocate stages (for example, denoiser, TTS/vocoder) to accelerators based on model cost and span length; containers may carry pinned dependencies and reproducible seeds so that renders may be re-created byte-identically (within numerical tolerance). Storage may be tiered: hot object storage for external renders (for example, composite dialogue stem, PLCOS assets), transactional storage for the structured media index 124 tables and manifests, and cold archival for prior PLCOS versions. Telemetry may capture per-stage latency, GPU utilization, and quality-metric dashboards; failure-domain isolation (for example, per-stage retries and idempotent writes) may prevent partial updates from corrupting provenance. This computing environment may allow processor 104 to scale from single-workstation operation to clustered post-production, while preserving the separation of concerns between the structured media index 124 (authoritative metadata/provenance) and the external optimized media input 156 (PLCOS) artifacts.

With continued reference to FIG. 1, in some embodiments, the technical problem addressed by the apparatus may be the lack of a deterministic, provenance-preserving mechanism to repair degraded dialogue audio that may be embedded in video productions while maintaining lip-sync, speaker timbre, and editorial timing. Conventional production workflows may rely on ad hoc plug-ins (for example, denoisers or EQs) applied destructively within non-linear editors, fragmented transcription utilities without stable word/phoneme timing, or generic text-to-speech systems that may not honor shot boundaries, on-screen articulation, or the original speaker's identity. These approaches may yield inconsistent outcomes across revisions, may provide limited or no traceability to model versions or parameters, and may force operators to choose between intelligibility and authenticity when inputs may be band-limited, clipped, or contaminated by room reverberation and ambient noise. The result may be costly manual iteration (for example, slip-editing frames to chase lip-sync, hand-drawn EQ to match timbre, or re-cutting captions) with no unified record tying choices to measurable quality or compliance constraints.

With continued reference to FIG. 1, processor 104 may improve the state of the art by introducing a mapping pipeline that may transform media inputs into a Structured Media Index, which may unify diarization, word- and phoneme-level CTMs, prosody contours, quality metrics, and scene/shot ranges under a single, versioned schema. Building on this foundation, processor 104 may execute two coordinated restoration pathways: an enhancement path (neural denoising, dereverberation, bandwidth extension, equalization, and de-essing) regulated by a timbre-preservation constraint; and a reconstruction path that may synthesize only the spans that truly require replacement via speaker-conditioned, phoneme-level TTS/vocoder with prosody matching and safety controls. A metadata alignment engine may then micro-retime within bounded tolerances to maintain lip-sync across editorial timelines, regenerate captions, and persist alignment across re-renders. By separating the authoritative metadata/provenance (Structured Media Index) from externally consumable artifacts (for example, the composite dialogue stem and alignment-conformed assets), the apparatus may enable deterministic re-renders, auditability, and targeted updates without reprocessing or degrading original media inputs.

With continued reference to FIG. 1, relative to conventional computer-based post-production systems, the apparatus may deliver measurable and repeatable quality improvements under guardrails. Quality scorers (for example, SNR, predicted PESQ/STOI proxies, WER deltas, true-peak margins, and lip-sync residuals) may be computed before/after each processing stage; policy decisions (Enhance, Reconstruct, Pass-through) may be learned from reviewer outcomes and constrained by minimum timbre similarity and intelligibility non-regression. Where legacy tools may apply global presets, processor 104 may apply span-specific parameter trajectories keyed to diarization, prosody, and shot context, and may serialize those control curves for reproducibility. Where generic TTS may produce fluent but stylistically mismatched speech, the apparatus may condition synthesis on speaker embeddings recovered from high-confidence segments of the same project and may match F0/energy/duration locally to preserve delivery and identity within defined tolerances.

With continued reference to FIG. 1, the apparatus 100 may also address the technical problem of timeline drift and caption mismatch that may arise when editorial changes occur late in production. Existing devices may require full manual re-cutting or fragile EDL imports; in contrast, the timeline modeler may build a timecode graph from source to sequence to export domains, binding clip GUIDs and timebases so that micro-retiming and caption regeneration may be incremental and verifiable. Checksum- and GUID-based persistence may detect exactly which spans require rework, and CTC back-checks may verify that post-retime audio remains consistent with intended text. This may eliminate frame-chasing and caption slip errors, improving both efficiency and conformance.

With continued reference to FIG. 1, the net improvement over conventional computing devices used in the field may therefore include: (i) end-to-end determinism via a Structured Media Index and model registry with reproducible seeds; (ii) selective, phoneme-level reconstruction under explicit consent and watermarking, rather than whole-line re-voicing; (iii) objective guardrails that may prevent intelligibility regressions or timbre drift; (iv) alignment continuity across edits with bounded micro-retiming and preserved cue identifiers; and (v) delivery of a Provenance-Linked Conformed Output Set (PLCOS)—including a high-resolution mixed master, stems, captions, reports, session file, and a metrics/model manifest—each artifact traceably linked to the models, parameters, and decisions that produced it. In aggregate, processor 104 may convert a brittle, manual, and non-reproducible set of point tools into a cohesive, auditable, and quality-constrained apparatus that may optimize media inputs for distribution while preserving the authenticity of the original performance.

Figure 2:
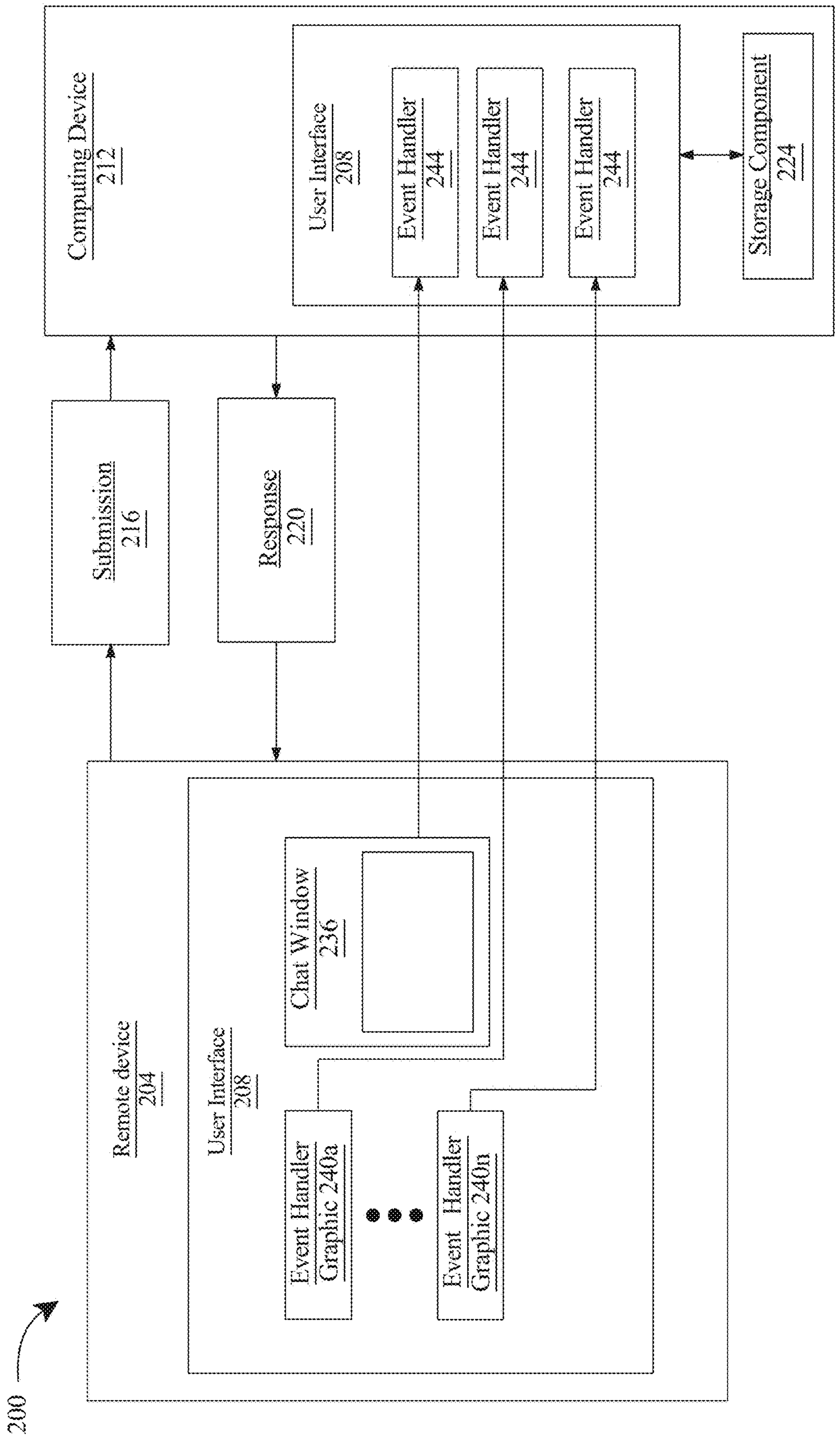
FIG. 2 is an exemplary diagram of a user interface.

Referring now to FIG. 2, a user interface 200 is schematically illustrated. The user interface 200 may be integrated with processor 104 to orchestrate the end-to-end workflow of the apparatus described herein. In some embodiments, user interface 200 may expose ingest controls that may allow authorized users of a subject organization to submit media inputs and associated metadata, to declare consent/authorization for speaker-conditioned synthesis, and to select project presets (for example, target LUFS and export formats). User interface 200 may further present dashboards backed by the Structured Media Index that may visualize the Media Manifest, analysis tables (for example, diarization segments, CTMs, prosody contours, quality metrics), and alignment status, and may provide event handler graphics to trigger mapping pipeline execution, enhancement versus reconstruction policy selection, and re-renders of specific spans. In some cases, user interface 200 may display synchronized picture-waveform previews with lip-sync overlays, before/after A/B monitoring for enhanced or reconstructed regions, guardrail outcomes (for example, timbre-similarity and predicted STOI/PESQ deltas), and artifact detector flags, and may collect reviewer accept/reject labels that processor 104 may log for continuous improvement. Upon completion, user interface 200 may present links to external outputs (for example, the composite dialogue stem, alignment-conformed captions, mix-ready stems, and PLCOS artifacts) while recording stable identifiers, checksums, and provenance back into the Structured Media Index. User interface 200 may configure a computing device 212 to configure a remote device 204 to perform display, input, and output functions, without limitation of a user interface. According to some embodiments, a user interface 208 may be communicative with a computing device 212, such as computing device as described above, that is configured to operate a chatbot. In some cases, user interface 208 may be local to computing device 212. Alternatively or additionally, in some cases, user interface 208 may remote to computing device 212 and communicative with the computing device 212, by way of one or more networks, such as without limitation the internet. Alternatively or additionally, user interface 208 may communicate with user device using telephonic devices and networks, such as without limitation fax machines, short message service (SMS), or multimedia message service (MMS). Commonly, user interface 208 communicates with computing device 212 using text-based communication, for example without limitation using a character encoding protocol, such as American Standard for Information Interchange (ASCII). Textual communication may be made between two or more users operating user devices, each of which may be configured by computing device to implement user interface. Two or more users may communicate with one another via user interface instances; alternatively or additionally, user interface 208 may conversationally interface using a chatbot, by way of at least a submission 216, from the user interface 208 to the chatbot, and a response 220, from the chatbot to the user interface 208. In many cases, one or both of submission 216 and response 220 are text-based communication. Alternatively or additionally, in some cases, one or both of submission 216 and response 220 are audio-based communication.

Continuing in reference to FIG. 2, a submission 216 once received by computing device 212 operating a chatbot, may be processed by circuitry and/or a processor, for instance and without limitation as described above. In some embodiments, processor processes a submission 216 using one or more of keyword recognition, pattern matching, and natural language processing. In some embodiments, processor employs real-time learning with evolutionary algorithms. In some cases, processor may retrieve a pre-prepared response from at least a storage component 224, based upon submission 216. Alternatively or additionally, in some embodiments, processor communicates a response 220 without first receiving a submission 216, thereby initiating conversation. Alternatively or additionally, processor may input user-submitted or other text as an input and may output a textual response using one or more generative artificial intelligence processes and/or components, such as without limitation an LLM or other generative model as described above. In some cases, processor communicates an inquiry to user interface 208; and the processor is configured to process an answer to the inquiry in a following submission 216 from the user interface 208. In some cases, an answer to an inquiry present within a submission 216 from a user device may be used by computing device as an input to another function; inputs may include without limitation, composition data, pecuniary goal data, data suitable for use as survey data, or the like. Inputs generated by a chatbot may be input, without limitation, to any process, module, component, or other element described in this disclosure that can accept an input.

Still referring to FIG. 2, apparatus may, for instance, use a client-side program to configure a user device to display data and/or to perform event handling of user inputs; such display may be implemented, without limitation, as a graphical user interface. For instance, and without limitation, apparatus may display any output of any authentication process, any output of computation of predicted message, any output of any process used in computation of predicted message, any output of any authorization process, and/or any output of processes used to perform authorization. Apparatus and/or circuitry may configure a user device to display one or more event handler graphics 240*a-n*. As used in this disclosure, an "event handler graphic 240*a-n*" is a graphical element with which a user of remote device may interact to enter data, for instance and without limitation for a search query or the like as described in further detail below. An event handler graphic 240*a-n* may include, without limitation, a button, a link, a checkbox, a text entry box and/or window, a drop-down list, a slider, or any other event handler graphic 240*a-n* that may occur to a person skilled in the art upon reviewing the entirety of this disclosure. An "event handler 244," as used in this disclosure, is a module, data structure, function, and/or routine that performs an action on remote device in response to a user interaction with event handler graphic 240*a-n*. For instance, and without limitation, an event handler 244 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 244 may generate prompts for further information, may compare data to validation rules such as requirements that the data in question be entered within certain numerical ranges, and/or may modify data and/or generate warnings to a user in response to such requirements. Event handler 244 may convert data into expected and/or desired formats, for instance such as date formats, currency entry formats, name formats, or the like. Event handler 244 may transmit data from remote device to apparatus and/or circuitry.

In an embodiment, and further referring to FIG. 1, event handler 244 may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on apparatus and/or circuitry; for instance, data may be saved wholly or in part as a "cookie" which may include data or an identification of remote device to prompt provision of cross-session state variable by apparatus and/or circuitry, which may store the data on apparatus and/or circuitry. Alternatively, or additionally, apparatus and/or circuitry may use login credentials, device identifier, and/or device fingerprint data to retrieve cross-session state variable, which apparatus and/or circuitry may transmit to remote device. Cross-session state variable may include at least a prior session datum. A "prior session datum" may include any element of data that may be stored in a cross-session state variable. Event handler graphic 240*a-n* may be further configured to display the at least a prior session datum, for instance and without limitation auto-populating user query data from previous sessions.

With continued reference to FIG. 2, in one or more embodiments, users may utilize instances of user interface 200 to exchange text messages with each other. User interface 208 may include functionality to configure each or any remote device to display a chat window 236. Chat window 236 may include a window or field that displays text generated by one or more users and/or chatbot outputs, and/or a window or field for entry of textual data by a user; windows and/or fields for display and entry may be separate. An event handler graphic 240*a-n* and/or event handler 244 may transmit textual entries and/or display such entries, for instance and without limitation when a user "posts" such entries to make them visible to a chatbot and/or another user.

Figure 3:
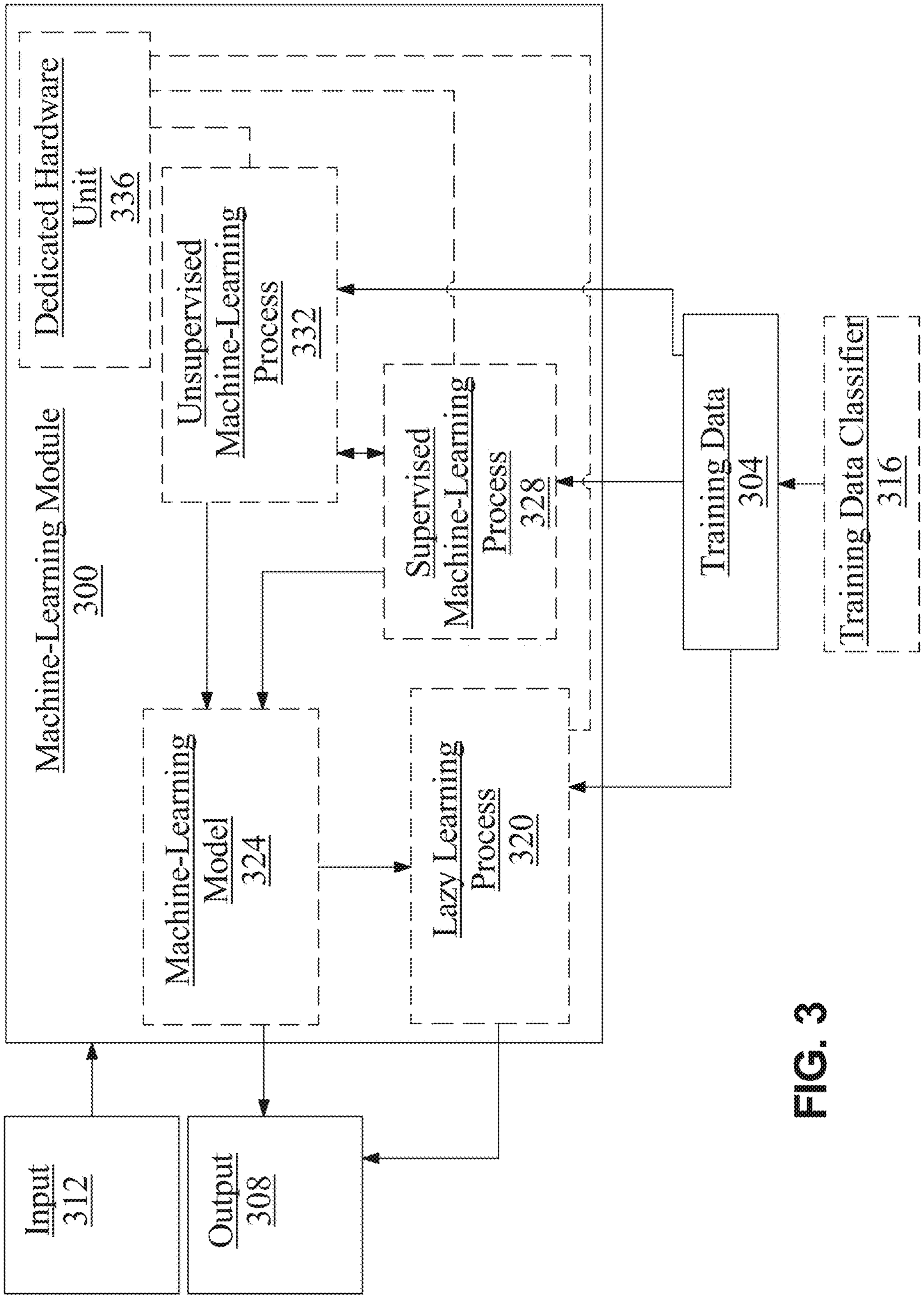
FIG. 3 is an exemplary embodiment of a machine-learning module.

Referring now to FIG. 3, an exemplary embodiment of a machine-learning module 300 that may perform one or more machine-learning processes as described in this disclosure is illustrated. Any engine, module, or controller described herein-including without limitation the diarization engine, ASR and alignment engine, quality metrics engine, prosody extractor, degradation-detection engine and flagging policy classifier, neural denoising engine, dereverberation engine, bandwidth-extension engine, equalization and de-essing module, timbre-embedding extractor, TTS and vocoder stack, prosody-matching controller, artifacts detector, boundary locator and spectral-matching equalizer, loudness-normalization engine, timeline modeler and micro-retiming controller, caption and transcript conformer, side-chain ducking controller, noise-floor shaper, policy layer, and continuous-improvement controller—may be instantiated as, or may incorporate, a machine-learning model generated as described for machine-learning module 300. In some cases, these components may share common infrastructure for training data ingestion, model registry, checkpointing, evaluation metrics, and reproducible seeds, while exposing component-specific inputs, outputs, and operating ranges that are recorded in the Structured Media Index. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, inputs may include raw dialogue excerpts paired with scene or shot identifiers; mixed audio with embedded noise and reverberation; optional dialogue/music/effects stems; provisional transcripts and word-level CTMs; phoneme-level alignments where available; speaker-embedding exemplars; noise profiles (for example, spectral envelopes and modulation statistics); quality metrics (for example, SNR, predicted PESQ/STOI proxies); band-limitation flags; reverberation estimates (for example, T60); prosody contours (F0, energy, duration vectors); and reviewer outcome labels (for example, accept/reject per span, QA tags). Corresponding outputs may include denoising masks and dereverberation filters; bandwidth-extension targets (for example, upper-band spectral estimates); updated ASR/forced-alignment CTMs and diarization segmentations; grapheme-to-phoneme mappings and duration priors; TTS acoustic targets (for example, mel-spectrograms) and vocoder waveforms for reconstructed spans; prosody-matching control curves (for example, pitch and duration adjustments within lip-sync tolerances); artifacts-detector labels (for example, musical noise, phasiness); loudness offsets and limiting decisions meeting a target (for example, −16 LUFS with ≤−1 dBTP); ducking envelopes keyed to speech energy; and policy actions per segment (Enhance, Reconstruct, Pass-through) together with timbre-similarity scores and guardrail justifications. These inputs and outputs may be correlated and learned by machine-learning module 300 so that processor 104 may improve span selection, parameter prediction, and reconstruction quality over successive projects while preserving provenance in the Structured Media Index.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to cohorts defined by capture chain and degradation regime (for example, lavalier vs. shotgun microphones; interior office HVAC noise vs. exterior traffic noise; low-SNR vs. clipping-dominant spans; short vs. long T60 reverberation), speaker role and language context (for example, on-camera subject vs. off-camera interviewer; monolingual vs. code-switched utterances), editorial and prosodic context (for example, close-up vs. wide shot; high-energy sibilant segments vs. low-voicing vowels), and authorization status for reconstruction (for example, consented speaker embeddings vs. enhancement-only), thereby enabling selection of sub-populations used to train or tune denoising, dereverberation, ASR/alignment, prosody extraction, and speaker-conditioned synthesis models specific to each cohort.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like, than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
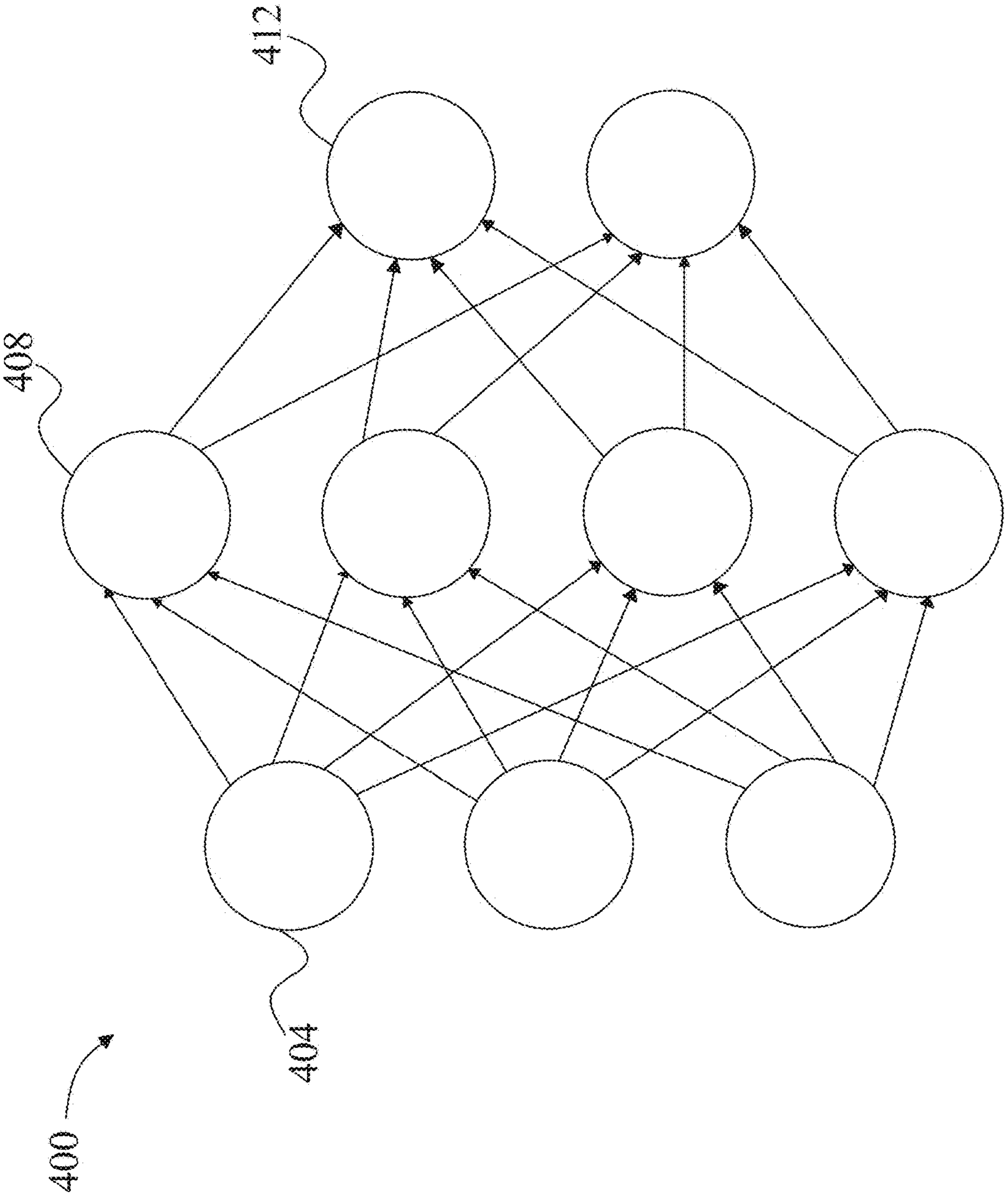
FIG. 4 is an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

With continued reference to FIG. 4, layers in neural network 400 may include, without limitation: (i) convolutional blocks (for example, 1-D or 2-D convolutions with kernel size k and dilation d) that may learn local time-frequency filters for denoising and dereverberation; (ii) recurrent or gated units (for example, LSTM/GRU) that may model temporal context for VAD gating or prosody tracking; (iii) attention or Transformer layers that may compute context-weighted mixtures over sequences for ASR alignment, G2P conversion, or TTS acoustic prediction; and (iv) fully connected (affine) layers that may perform final projections into target spaces (for example, mask logits, mel bins, or embedding dimensions). Each layer may apply a nonlinearity (for example, ReLU, GELU, or sigmoid), an optional normalization (for example, batch norm or layer norm), and residual or skip connections to stabilize training. Weights may be tensors We that may determine how inputs at layer e are filtered or combined; biases bl may shift activations; both may be updated during training to minimize a task-specific loss.

With continued reference to FIG. 4, training of neural network 400 may proceed by presenting batches of paired inputs and targets (for example, noisy-clean audio pairs for a denoiser; phoneme sequences with durations and target mel-spectrograms for a TTS acoustic model; raw audio and speaker IDs for an embedding extractor). A forward pass may compute predictions $\hat{y}$ from inputs x via successive layer transformations; a loss $L(\hat{y}, y)$ may be computed (for example, multi-resolution STFT loss for waveform fidelity, CTC or cross-entropy for token prediction, contrastive or angular-margin losses for speaker embeddings). Processor 104 may compute gradients $\partial L/\theta W1$ and $\theta L/\partial b\partial$ by back-propagation and may update parameters using an optimizer (for example, Adam or SGD with momentum) under learning-rate schedules and regularization (for example, weight decay, dropout). Checkpoints may be saved along with optimizer states and random seeds to enable deterministic reproduction; evaluation metrics (for example, STOI/PESQ proxies, WER on validation sets, or embedding verification EER) may be logged to the model registry.

With continued reference to FIG. 4, specific module instantiations of neural network 400 may include: (a) a UNet-style time-frequency denoiser that may predict a real/imaginary mask M(f, t), where the output waveform may be reconstructed by inverse STFT of $M \odot X$; (b) a dereverberation residual network trained to reduce late-reverb energy after a WPE front end; (c) a speaker-embedding extractor (for example, ResNet or TDNN) that may map short utterances to fixed-length x-vectors or d-vectors used for timbre preservation and reconstruction conditioning; (d) a Transformer-based TTS acoustic model that may accept phoneme tokens, per-phoneme duration targets, optional F0/energy control signals, and a speaker embedding, and may output mel-spectrograms; and (e) a neural vocoder (for example, diffusion-, flow-, or autoregressive-based) that may synthesize time-domain waveforms from mel-spectrograms while honoring true-peak constraints. For alignment back-checks, a streaming transducer may be used to re-decode short windows and verify consistency after micro-retiming.

With continued reference to FIG. 4, deployment variants of neural network 400 may include quantized (for example, 8-bit or 16-bit) or pruned models for low-latency stages (for example, VAD or double-talk detection), ensemble checkpoints for safety-critical gates (for example, artifacts detector voting), and conditional adapters or LoRA-style low-rank adapters that may specialize a base model to a project domain (for example, microphone type or language) without retraining all weights. Inputs may be normalized by per-project statistics written to the Structured Media Index (for example, mean-variance of mel features, loudness normalization), and outputs may be constrained by policy guardrails (for example, embedding-similarity thresholds for timbre preservation, duration elasticity bounds for lip-sync). Model identifiers, weight hashes, and configuration snapshots may be embedded in render metadata so that any output in PLCOS may be traced to the exact layer configurations and weights used.

Figure 5:
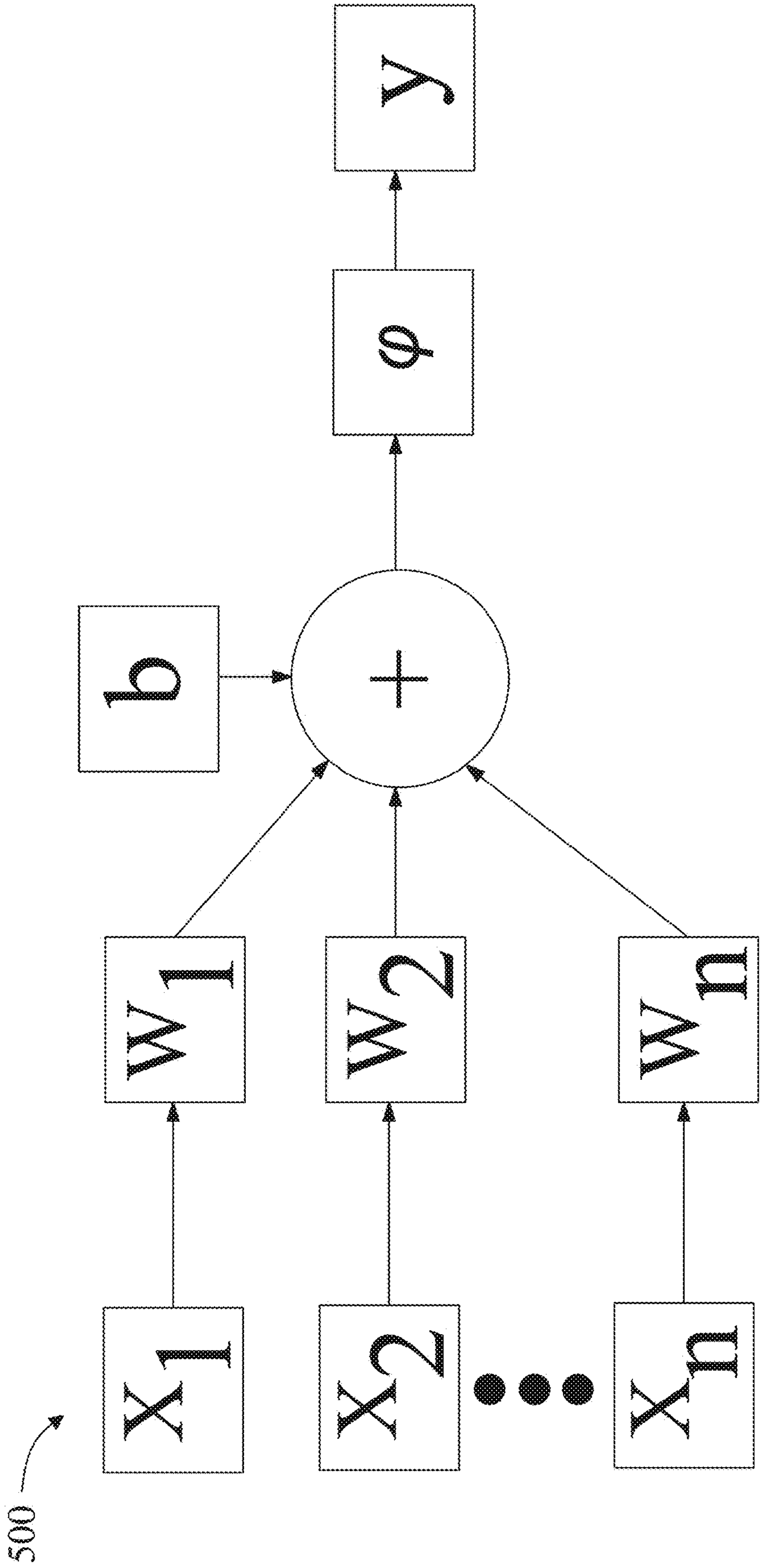
FIG. 5 is an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
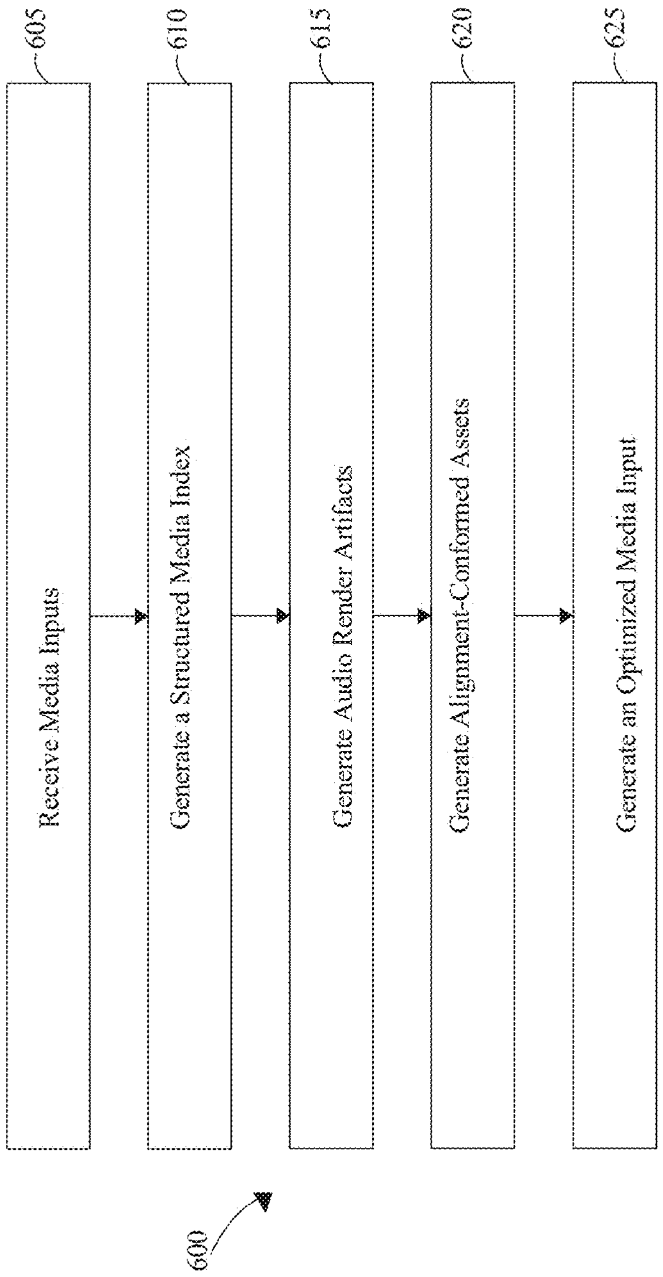
FIG. 6 is a flow diagram of an exemplary method of automated generation of an optimized media input.

Referring now to FIG. 6, an exemplary embodiment of a method 600 for automated generation of an optimized media input is illustrated. Method 600 may include processors, software, methods, and configurations a disclosed and with reference to FIGS. 1-5. At step 605, method 600 includes receiving, by a processor, media inputs. At step 610, method 600 includes generating, by the processor, a structured media index, wherein generation includes implementing a mapping pipeline configured to transform the media inputs into structured data fields. At step 615, method 600 includes generating, by the processor, audio render artifacts based on enhanced and reconstructed dialogue spans referenced in the structured media index, wherein generation includes implementing a blending and loudness-normalization module, wherein the audio render artifacts comprise at least time-aligned waveform files. At step 620, method 600 includes generating, by the processor, alignment-conformed assets based on the audio render artifacts and structured media index. At step 625, method 600 includes generating, by the processor, an optimized media input based on the alignment-conformed assets, audio render artifacts, and structured media index, wherein generation includes implementing an orchestration engine configured as a scheduler and dependency resolver.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
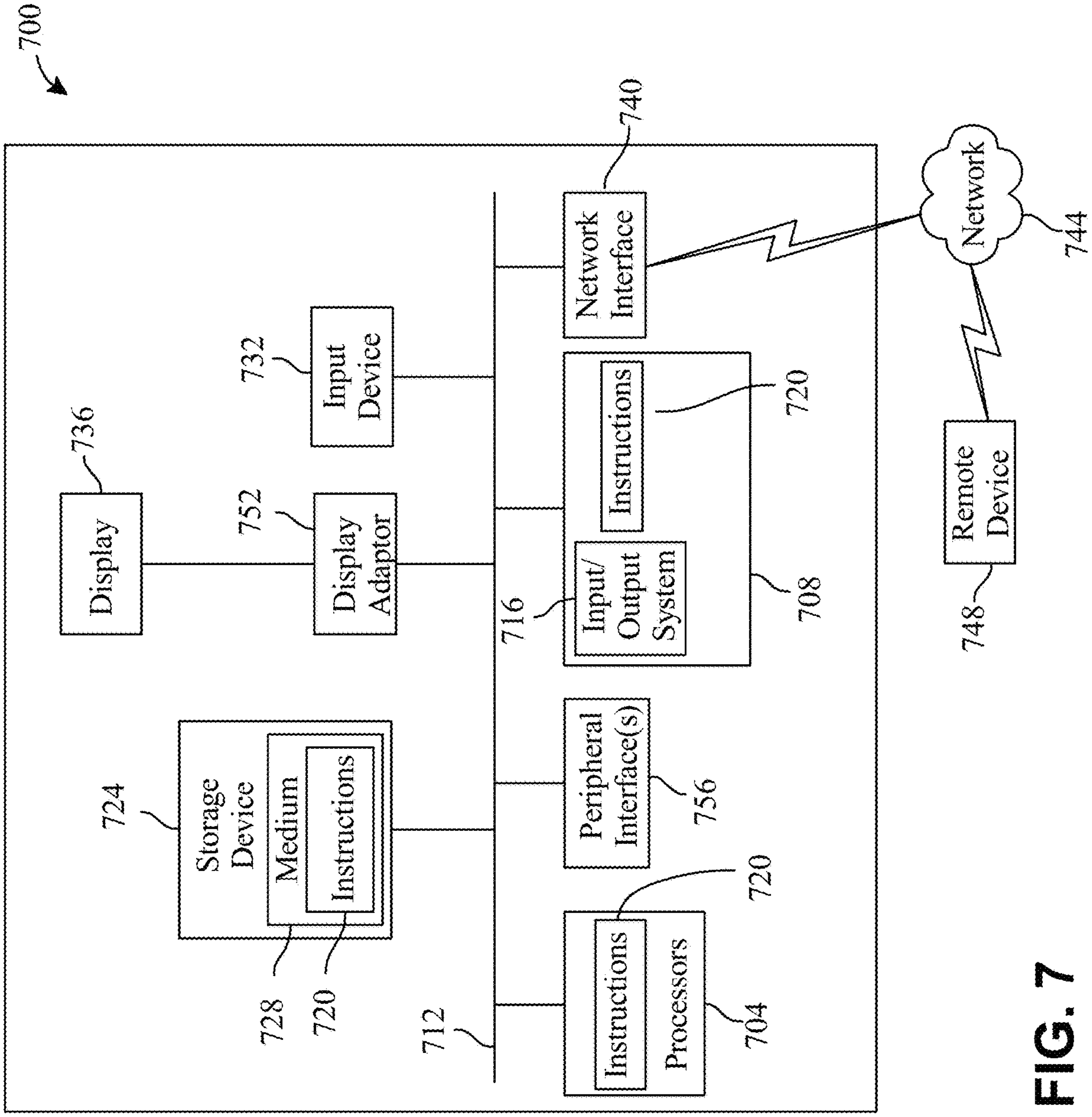
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of(1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automated generation of an optimized media input, the apparatus comprising:

at least a processor; and a memory communicatively connected to the at least a processor, wherein the memory contains instructions configuring the at least a processor to:

receive media inputs;

generate a structured media index, wherein generation of the structured media index comprises implementing a mapping pipeline by transforming the media inputs into structured data fields;

generate audio render artifacts based on enhanced and reconstructed dialogue spans referenced in the structured media index, wherein generation of the audio render artifacts comprises implementing a blending and loudness-normalization module, wherein the audio render artifacts comprise at least time-aligned waveform files;

generate alignment-conformed assets based on the audio render artifacts and structured media index; and generate an optimized media input based on the alignment-conformed assets, audio render artifacts, and structured media index, wherein generation of the optimized media input comprises implementing an orchestration engine configured as a scheduler and dependency resolver, wherein generating the alignment-conformed assets comprises implementing a metadata alignment engine configured to: parse editorial timelines; model timecode relationships among source, sequence, and export domains; micro-retime audio events to remain within a lip-sync tolerance window; regenerate captions and transcripts with corrected timings; and persist alignment across re-renders.

2. The apparatus of claim 1, wherein receiving the media inputs further comprises validating and normalizing the media inputs.

3. The apparatus of claim 2, wherein:

validation comprises, at least, verifying container integrity; and normalization comprises, at least, converting frame rates to a canonical time base for internal calculations.

4. The apparatus of claim 1, wherein the mapping pipeline comprises a speech pre-processing module configured to output normalized, analysis-ready dialogue regions with auxiliary tags for downstream decision-making.

5. The apparatus of claim 1, wherein the mapping pipeline comprises an enhancement path configured to perform a sequence of restoration stages to output versioned dialogue renders and per-segment parameter traces to enable downstream reconstruction decisions.

6. The apparatus of claim 1, wherein the mapping pipeline comprises a reconstruction path configured to perform a sequence of phoneme-level synthesis stages to output versioned, time-aligned dialogue renders together with per-span provenance and control parameters.

7. The apparatus of claim 1, wherein the orchestration engine is further configured to:

read the structured media index;

select models and presets from a model registry;

construct a render graph over candidate spans; and commit outputs and provenance.

8. The apparatus of claim 1, further comprising a music and ambience integration module to produce mix-ready stems while preserving dialogue intelligibility based on at least the alignment-conformed assets.

9. The apparatus of claim 1, further comprising a metrics and feedback layer configured to capture at least composition metadata and integrate into the structured media index.

10. A method for automated generation of an optimized media input, the method comprising:

receiving, by a processor, media inputs;

generating, by the processor, a structured media index, wherein generation of the structured media index comprises implementing a mapping pipeline by transforming the media inputs into structured data fields;

generating, by the processor, audio render artifacts based on enhanced and reconstructed dialogue spans referenced in the structured media index, wherein generation of the audio render artifacts comprises implementing a blending and loudness-normalization module, wherein the audio render artifacts comprise at least time-aligned waveform files;

generating, by the processor, alignment-conformed assets based on the audio render artifacts and structured media index; and generating, by the processor, an optimized media input based on the alignment-conformed assets, audio render artifacts, and structured media index, wherein generation of the optimized media input comprises implementing an orchestration engine configured as a scheduler and dependency resolver, wherein generating the alignment-conformed assets comprises implementing a metadata alignment engine configured to: parse editorial timelines; model timecode relationships among source, sequence, and export domains; micro-retime audio events to remain within a lip-sync tolerance window; regenerate captions and transcripts with corrected timings; and persist alignment across re-renders.

11. The method of claim 10, wherein receiving the media inputs further comprises validating and normalizing the media inputs.

12. The method of claim 11, wherein:

validation comprises, at least, verifying container integrity; and normalization comprises, at least, converting frame rates to a canonical time base for internal calculations.

13. The method of claim 10, wherein the mapping pipeline comprises a speech pre-processing module configured to output normalized, analysis-ready dialogue regions with auxiliary tags for downstream decision-making.

14. The method of claim 10, wherein the mapping pipeline comprises an enhancement path configured to perform a sequence of restoration stages to output versioned dialogue renders and per-segment parameter traces to enable downstream reconstruction decisions.

15. The method of claim 10, wherein the mapping pipeline comprises a reconstruction path configured to perform a sequence of phoneme-level synthesis stages to output versioned, time-aligned dialogue renders together with per-span provenance and control parameters.

16. The method of claim 10, wherein the orchestration engine is further configured to:

read the structured media index;

select models and presets from a model registry;

construct a render graph over candidate spans; and commit outputs and provenance.

17. The method of claim 10, further comprising a music and ambience integration module to produce mix-ready stems while preserving dialogue intelligibility based on at least the alignment-conformed assets.

18. The method of claim 10, further comprising a metrics and feedback layer configured to capture at least composition metadata and integrate into the structured media index.

* * * * *